United States Patent
Inatomi et al.

(10) Patent No.: US 8,189,994 B2
(45) Date of Patent: May 29, 2012

(54) DEVICE AND METHOD FOR GIVING IMPORTANCE INFORMATION ACCORDING TO VIDEO OPERATION HISTORY

(75) Inventors: Yasuaki Inatomi, Kanagawa-ken (JP); Mitsuhiro Kageyama, Kanagawa-ken (JP)

(73) Assignee: Panasonic Corporation, Osaka (JP)

( * ) Notice: Subject to any disclaimer, the term of this patent is extended or adjusted under 35 U.S.C. 154(b) by 843 days.

(21) Appl. No.: 12/298,208

(22) PCT Filed: Apr. 24, 2007

(86) PCT No.: PCT/JP2007/058783
§ 371 (c)(1),
(2), (4) Date: Oct. 23, 2008

(87) PCT Pub. No.: WO2007/125882
PCT Pub. Date: Nov. 8, 2007

(65) Prior Publication Data
US 2009/0202218 A1      Aug. 13, 2009

(30) Foreign Application Priority Data
Apr. 24, 2006   (JP) .................................. 2006-118638

(51) Int. Cl.
*H04N 9/80* (2006.01)
(52) U.S. Cl. ...................................... 386/248
(58) Field of Classification Search .................. 386/343, 386/344, 239, 240, 248
See application file for complete search history.

(56) References Cited

U.S. PATENT DOCUMENTS

| 5,746,601 A * | 5/1998 | Yoon .............................. 434/156 |
| 6,366,956 B1 * | 4/2002 | Krishnan ....................... 709/223 |
| 6,557,042 B1 * | 4/2003 | He et al. ......................... 709/231 |
| 7,406,655 B2 * | 7/2008 | Jun ................................. 715/201 |
| 2003/0121058 A1 * | 6/2003 | Dimitrova et al. ............. 725/134 |
| 2005/0114539 A1 * | 5/2005 | Yoon et al. ..................... 709/231 |
| 2005/0132401 A1 * | 6/2005 | Boccon-Gibod et al. ....... 725/34 |
| 2006/0130097 A1 * | 6/2006 | Lee et al. ......................... 725/50 |
| 2006/0145756 A1 * | 7/2006 | Lee et al. ......................... 330/10 |
| 2008/0172293 A1 * | 7/2008 | Raskin et al. ................... 705/14 |
| 2008/0196058 A1 * | 8/2008 | Terada et al. .................. 725/32 |

FOREIGN PATENT DOCUMENTS

| JP | 9-46688 A | 2/1997 |
| JP | 2000-331008 A | 11/2000 |
| WO | WO 2004/104881 A1 | 12/2004 |

* cited by examiner

*Primary Examiner* — David Harvey
(74) *Attorney, Agent, or Firm* — RatnerPrestia

(57) ABSTRACT

A device for giving importance information according to a video operation history includes an interest video searching operation block detection unit provided with a minimum searching operation block detection unit for detecting a minimum searching operation block as a minimum unit which exists in an interest video searching operation block from a preview log as a video operation history of a user, and a searching operation block setting unit for setting the interest video searching operation block through determination with respect to an operation previous and subsequent to the detected minimum searching operation block as a base point based on a feature of the interest video searching operation block.

10 Claims, 29 Drawing Sheets

FIG. 2

| OPERATION NO. | OPERATION TYPE | OPERATION TYPE NO. | OPERATION DIRECTION | IN POINT | OUT POINT |
|---|---|---|---|---|---|
| 1 | FAST FORWARDING | 2 | + | 00:00:00 | 00:00:15 |
| 2 | REPLAYING | 1 | + | 00:00:15 | 00:00:17 |
| 3 | FAST FORWARDING | 2 | + | 00:00:17 | 00:00:30 |
| 4 | REPLAYING | 1 | + | 00:00:30 | 00:00:35 |
| 5 | REWINDING | 3 | − | 00:00:35 | 00:00:12 |
| 6 | REPLAYING | 1 | + | 00:00:12 | 00:00:14 |
| 7 | FAST FORWARDING | 2 | + | 00:00:14 | 00:00:25 |
| 8 | REWINDING | 3 | − | 00:00:25 | 00:00:18 |
| 9 | REPLAYING | 1 | + | 00:00:18 | 00:00:36 |
| 10 | FAST FORWARDING | 2 | + | 00:00:36 | 00:00:46 |
| 11 | REPLAYING | 1 | + | 00:00:46 | 00:01:15 |
| 12 | REWINDING | 3 | − | 00:01:15 | 00:01:00 |
| 13 | REPLAYING | 1 | + | 00:01:00 | 00:01:03 |
| 14 | FAST FORWARDING | 2 | + | 00:01:03 | 00:01:10 |
| 15 | REPLAYING | 1 | + | 00:01:10 | 00:01:35 |

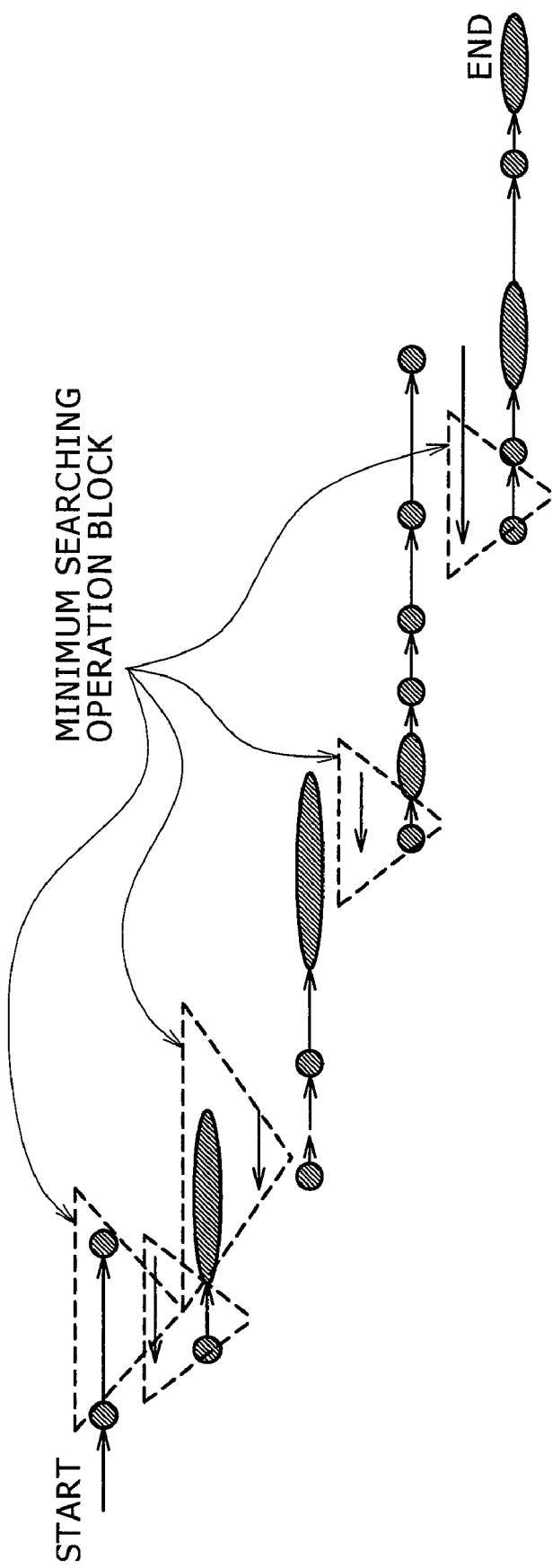

FIG.11
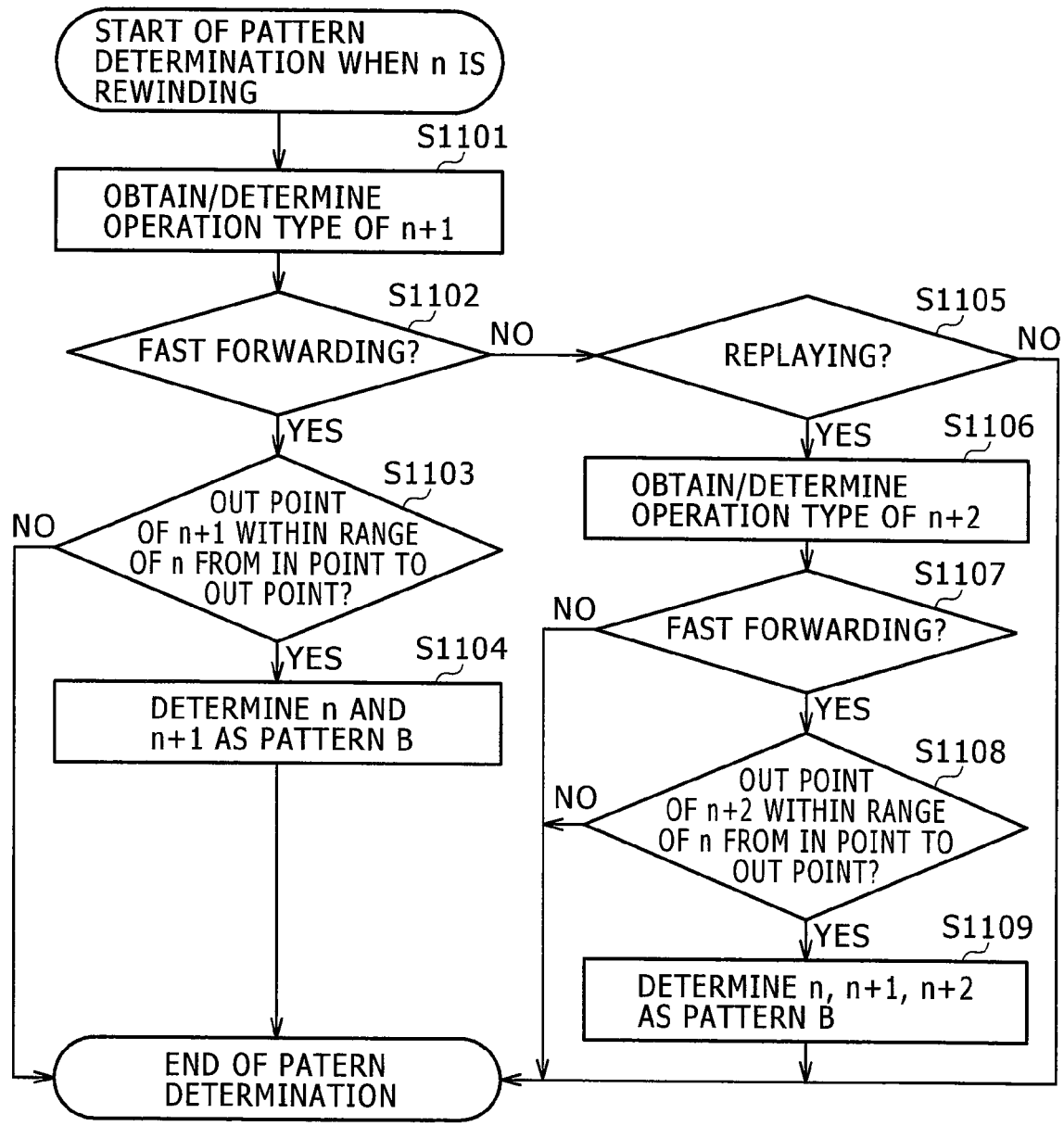
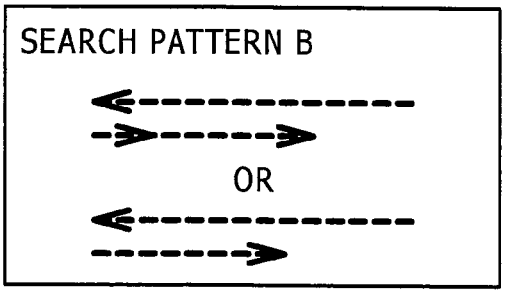

FIG.13

| OPERATION NO. | OPERATION TYPE | OPERATION TYPE NO. | OPERATION DIRECTION | IN POINT | OUT POINT | PATTERN TYPE | |
|---|---|---|---|---|---|---|---|
| 1 | FAST FORWARDING | 2 | + | 00:00:00 | 00:00:15 | | |
| 2 | REPLAYING | 1 | + | 00:00:15 | 00:00:17 | | |
| 3 | FAST FORWARDING | 2 | + | 00:00:17 | 00:00:30 | | |
| 4 | REPLAYING | 1 | + | 00:00:30 | 00:00:35 | | |
| 5 | REWINDING | 3 | − | 00:00:35 | 00:00:12 | B | ⎫ DETERMINED AS PATTERN B |
| 6 | REPLAYING | 1 | + | 00:00:12 | 00:00:14 | B | |
| 7 | FAST FORWARDING | 2 | + | 00:00:14 | 00:00:25 | B, A | ⎫ DETERMINED AS PATTERN A |
| 8 | REWINDING | 3 | − | 00:00:25 | 00:00:18 | A | |
| 9 | REPLAYING | 1 | + | 00:00:18 | 00:00:36 | | |
| 10 | FAST FORWARDING | 2 | + | 00:00:36 | 00:00:46 | | |
| 11 | REPLAYING | 1 | + | 00:00:46 | 00:01:15 | C-S | ⎫ DETERMINED AS PATTERN C |
| 12 | REWINDING | 3 | − | 00:01:15 | 00:01:00 | C, B | ⎫ DETERMINED AS PATTERN B |
| 13 | REPLAYING | 1 | + | 00:01:00 | 00:01:03 | B | |
| 14 | FAST FORWARDING | 2 | + | 00:01:03 | 00:01:10 | B | |
| 15 | REPLAYING | 1 | + | 00:01:10 | 00:01:35 | | |

FIG.15

| OPERATION NO. | OPERATION TYPE | OPERATION TYPE NO. | OPERATION DIRECTION | IN POINT | OUT POINT | PATTERN TYPE |
|---|---|---|---|---|---|---|
| 1 | FAST FORWARDING | 2 | + | 00:00:00 | 00:00:15 | |
| 2 | REPLAYING | 1 | + | 00:00:15 | 00:00:17 | |
| 3 | FAST FORWARDING | 2 | + | 00:00:17 | 00:00:30 | |
| 4 | REPLAYING | 1 | + | 00:00:30 | 00:00:35 | |
| 5 | REWINDING | 3 | − | 00:00:35 | 00:00:12 | B |
| 6 | REPLAYING | 1 | + | 00:00:12 | 00:00:14 | B |
| 7 | FAST FORWARDING | 2 | + | 00:00:14 | 00:00:25 | B, A |
| 8 | REWINDING | 3 | − | 00:00:25 | 00:00:18 | A |
| 9 | REPLAYING | 1 | + | 00:00:18 | 00:00:36 | |
| 10 | FAST FORWARDING | 2 | + | 00:00:36 | 00:00:46 | |
| 11 | REPLAYING | 1 | + | 00:00:46 | 00:01:15 | C-S |
| 12 | REWINDING | 3 | − | 00:01:15 | 00:01:00 | C |
| 13 | REPLAYING | 1 | + | 00:01:00 | 00:01:03 | C |
| 14 | FAST FORWARDING | 2 | + | 00:01:03 | 00:01:10 | C |
| 15 | REPLAYING | 1 | + | 00:01:10 | 00:01:35 | |

COMBINE OVERLAPPED PATTERN B AS PATTERN C

FIG.17
CONTINUAL OPERATION PART 1
CONTINUAL OPERATION OF FAST FORWARDING OR COMBINATION OF FAST FORWARDING AND REPLAYING USING OPERATION TYPE IN THE SAME DIRECTION
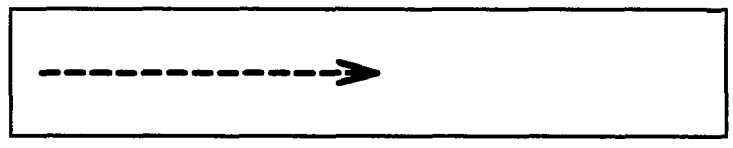
OPERATION TYPE 2
(FAST FORWARDING)
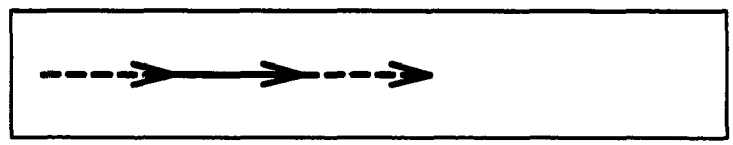
OPERATION TYPE 2-1-2
(FAST FORWARDING→REPLAYING→FAST FORWARDING)
OPERATION TYPE 1-2
(REPLAYING→FAST FORWARDING)

FIG.18
CONTINUAL OPERATION PART 2
CONTINUAL OPERATION OF REWINDING OR COMBINATION OF REWINDING AND REPLAYING CONTAINED IN REWINDING INTERVAL USING OPERATION TYPES IN OPPOSITE DIRECTIONS
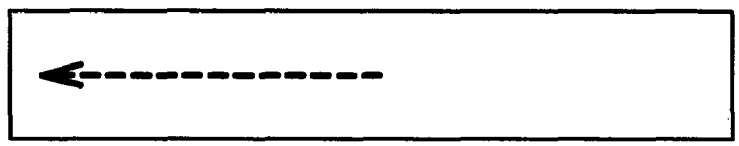
OPERATION TYPE 3
(REWINDING)
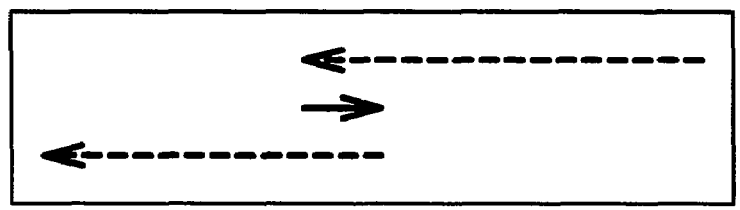
OPERATION TYPE 3-1-3
(REWINDING→REPLAYING→REWINDING)

FIG.19

| OPERATION NO. | OPERATION TYPE | OPERATION TYPE NO. | OPERATION DIRECTION | IN POINT | OUT POINT | PATTERN TYPE |
|---|---|---|---|---|---|---|
| 1 | FAST FORWARDING | 2 | + | 00:00:00 | 00:00:15 | |
| 2 | REPLAYING | 1 | + | 00:00:15 | 00:00:17 | |
| 3 | FAST FORWARDING | 2 | + | 00:00:17 | 00:00:30 | |
| 4 | REPLAYING | 1 | − | 00:00:30 | 00:00:35 | |
| 5 | REWINDING | 3 | + | 00:00:35 | 00:00:12 | B |
| 6 | REPLAYING | 1 | + | 00:00:12 | 00:00:14 | B |
| 7 | FAST FORWARDING | 2 | + | 00:00:14 | 00:00:25 | B, A |
| 8 | REWINDING | 3 | − | 00:00:25 | 00:00:18 | A |
| 9 | REPLAYING | 1 | + | 00:00:18 | 00:00:36 | |
| 10 | FAST FORWARDING | 2 | + | 00:00:36 | 00:00:46 | |
| 11 | REPLAYING | 1 | − | 00:00:46 | 00:01:15 | C-S |
| 12 | REWINDING | 3 | + | 00:01:15 | 00:01:00 | C |
| 13 | REPLAYING | 1 | + | 00:01:00 | 00:01:03 | C |
| 14 | FAST FORWARDING | 2 | + | 00:01:03 | 00:01:10 | C |
| 15 | REPLAYING | 1 | + | 00:01:10 | 00:01:35 | |

} OPERATION BLOCK WITH PATTERN C IS NOT EXTENDED

FIG. 21

| OPERATION NO. | OPERATION TYPE | OPERATION TYPE NO. | OPERATION DIRECTION | IN POINT | OUT POINT | PATTERN TYPE |
|---|---|---|---|---|---|---|
| 1 | FAST FORWARDING | 2 | + | 00:00:00 | 00:00:15 | |
| 2 | REPLAYING | 1 | + | 00:00:15 | 00:00:17 | |
| 3 | FAST FORWARDING | 2 | + | 00:00:17 | 00:00:30 | |
| 4 | REPLAYING | 1 | − | 00:00:30 | 00:00:35 | |
| 5 | REWINDING | 3 | + | 00:00:35 | 00:00:12 | B |
| 6 | REPLAYING | 1 | + | 00:00:12 | 00:00:14 | B |
| 7 | FAST FORWARDING | 2 | − | 00:00:14 | 00:00:25 | B |
| 8 | REWINDING | 3 | + | 00:00:25 | 00:00:18 | B |
| 9 | REPLAYING | 1 | + | 00:00:18 | 00:00:36 | |
| 10 | FAST FORWARDING | 2 | + | 00:00:36 | 00:00:46 | |
| 11 | REPLAYING | 1 | − | 00:00:46 | 00:01:15 | C-S |
| 12 | REWINDING | 3 | + | 00:01:15 | 00:01:00 | C |
| 13 | REPLAYING | 1 | + | 00:01:00 | 00:01:03 | C |
| 14 | FAST FORWARDING | 2 | + | 00:01:03 | 00:01:10 | C |
| 15 | REPLAYING | 1 | | 00:01:10 | 00:01:35 | |

} COMBINE OVERLAPPED PATTERN A AS PATTERN B

FIG. 24

| OPERATION NO. | OPERATION TYPE | OPERATION TYPE NO. | OPERATION DIRECTION | IN POINT | OUT POINT | PATTERN TYPE |
|---|---|---|---|---|---|---|
| 1 | FAST FORWARDING | 2 | + | 00:00:00 | 00:00:15 | B |
| 2 | REPLAYING | 1 | + | 00:00:15 | 00:00:17 | B |
| 3 | FAST FORWARDING | 2 | + | 00:00:17 | 00:00:30 | B |
| 4 | REPLAYING | 1 | + | 00:00:30 | 00:00:35 | B |
| 5 | REWINDING | 3 | − | 00:00:35 | 00:00:12 | B |
| 6 | REPLAYING | 1 | + | 00:00:12 | 00:00:14 | B |
| 7 | FAST FORWARDING | 2 | + | 00:00:14 | 00:00:25 | B |
| 8 | REWINDING | 3 | − | 00:00:25 | 00:00:18 | B |
| 9 | REPLAYING | 1 | + | 00:00:18 | 00:00:36 | |
| 10 | FAST FORWARDING | 2 | + | 00:00:36 | 00:00:46 | |
| 11 | REPLAYING | 1 | + | 00:00:46 | 00:01:15 | C-S |
| 12 | REWINDING | 3 | − | 00:01:15 | 00:01:00 | C |
| 13 | REPLAYING | 1 | + | 00:01:00 | 00:01:03 | C |
| 14 | FAST FORWARDING | 2 | + | 00:01:03 | 00:01:10 | C |
| 15 | REPLAYING | 1 | + | 00:01:10 | 00:01:35 | |

FIG. 25

| OPERATION NO. | OPERATION TYPE | OPERATION TYPE NO. | OPERATION DIRECTION | IN POINT | OUT POINT | PATTERN TYPE | |
|---|---|---|---|---|---|---|---|
| 1 | FAST FORWARDING | 2 | + | 00:00:00 | 00:00:15 | B | |
| 2 | REPLAYING | 1 | + | 00:00:15 | 00:00:17 | B | |
| 3 | FAST FORWARDING | 2 | + | 00:00:17 | 00:00:30 | B | |
| 4 | REPLAYING | 1 | − | 00:00:30 | 00:00:35 | B | |
| 5 | REWINDING | 3 | + | 00:00:35 | 00:00:12 | B | |
| 6 | REPLAYING | 1 | + | 00:00:12 | 00:00:14 | B | |
| 7 | FAST FORWARDING | 2 | − | 00:00:14 | 00:00:25 | B | |
| 8 | REWINDING | 3 | + | 00:00:25 | 00:00:18 | B | |
| 9 | REPLAYING | 1 | + | 00:00:18 | 00:00:36 | | |
| 10 | FAST FORWARDING | 2 | − | 00:00:36 | 00:00:46 | | ⎫ OPERATION BLOCK WITH PATTERN A OR B IS NOT EXTENDED |
| 11 | REPLAYING | 1 | + | 00:00:46 | 00:01:15 | C-S | |
| 12 | REWINDING | 3 | + | 00:01:15 | 00:01:00 | C | |
| 13 | REPLAYING | 1 | + | 00:01:00 | 00:01:03 | C | |
| 14 | FAST FORWARDING | 2 | + | 00:01:03 | 00:01:10 | C | |
| 15 | REPLAYING | 1 | + | 00:01:10 | 00:01:35 | | |

FIG. 26

| OPERATION NO. | OPERATION TYPE | OPERATION TYPE NO. | OPERATION DIRECTION | IN POINT | OUT POINT | SEARCHING OPERATION FLAG | |
|---|---|---|---|---|---|---|---|
| 1 | FAST FORWARDING | 2 | + | 00:00:00 | 00:00:15 | 1 | ⎫ |
| 2 | REPLAYING | 1 | + | 00:00:15 | 00:00:17 | 1 | ⎪ |
| 3 | FAST FORWARDING | 2 | + | 00:00:17 | 00:00:30 | 1 | ⎪ INTEREST VIDEO |
| 4 | REPLAYING | 1 | + | 00:00:30 | 00:00:35 | 1 | ⎬ SEARCHING |
| 5 | REWINDING | 3 | − | 00:00:35 | 00:00:12 | 1 | ⎪ OPERATION BLOCK |
| 6 | REPLAYING | 1 | + | 00:00:12 | 00:00:14 | 1 | ⎪ |
| 7 | FAST FORWARDING | 2 | + | 00:00:14 | 00:00:25 | 1 | ⎭ |
| 8 | REWINDING | 3 | − | 00:00:25 | 00:00:18 | 0 | |
| 9 | REPLAYING | 1 | + | 00:00:18 | 00:00:36 | 0 | |
| 10 | FAST FORWARDING | 2 | + | 00:00:36 | 00:00:46 | 0 | |
| 11 | REPLAYING | 1 | + | 00:00:46 | 00:01:15 | 1 | ⎫ |
| 12 | REWINDING | 3 | − | 00:01:15 | 00:01:00 | 1 | ⎬ INTEREST VIDEO SEARCHING |
| 13 | REPLAYING | 1 | + | 00:01:00 | 00:01:03 | 1 | ⎭ OPERATION BLOCK |
| 14 | FAST FORWARDING | 2 | + | 00:01:03 | 00:01:10 | 1 | |
| 15 | REPLAYING | 1 | + | 00:01:10 | 00:01:35 | 0 | |

FIG. 27

| OPERATION NO. | OPERATION TYPE | IN POINT | OUT POINT | SEARCHING OPERATION FLAG | FLAG SET IMMEDIATELY AFTER SEARCHING |
|---|---|---|---|---|---|
| 9 | REPLAYING | 00:00:18 | 00:00:36 | 0 | 1 |
| 11 | REPLAYING | 00:00:46 | 00:01:15 | 0 | 0 |
| 15 | REPLAYING | 00:01:10 | 00:01:35 | 0 | 1 |

FIG. 28A

| OPERATION NO. | OPERATION TYPE | IN POINT | OUT POINT | SEARCHING OPERATION FLAG | FLAG SET IMMEDIATELY AFTER SEARCHING | IMPORTANCE |
|---|---|---|---|---|---|---|
| 9 | REPLAYING | 00:00:18 | 00:00:36 | 0 | 1 | 10 |
| 11 | REPLAYING | 00:00:46 | 00:01:15 | 0 | 0 | 5 |
| 15 | REPLAYING | 00:01:10 | 00:01:35 | 0 | 1 | 10 |

FIG. 28B

| FLAG SET IMMEDIATELY AFTER SEARCHING | DEFINITION | IMPORTANCE |
|---|---|---|
| 1 | REPLAYING IMMEDIATELY AFTER SEARCHING | 10 |
| 0 | OTHER REPLAYING | 5 |

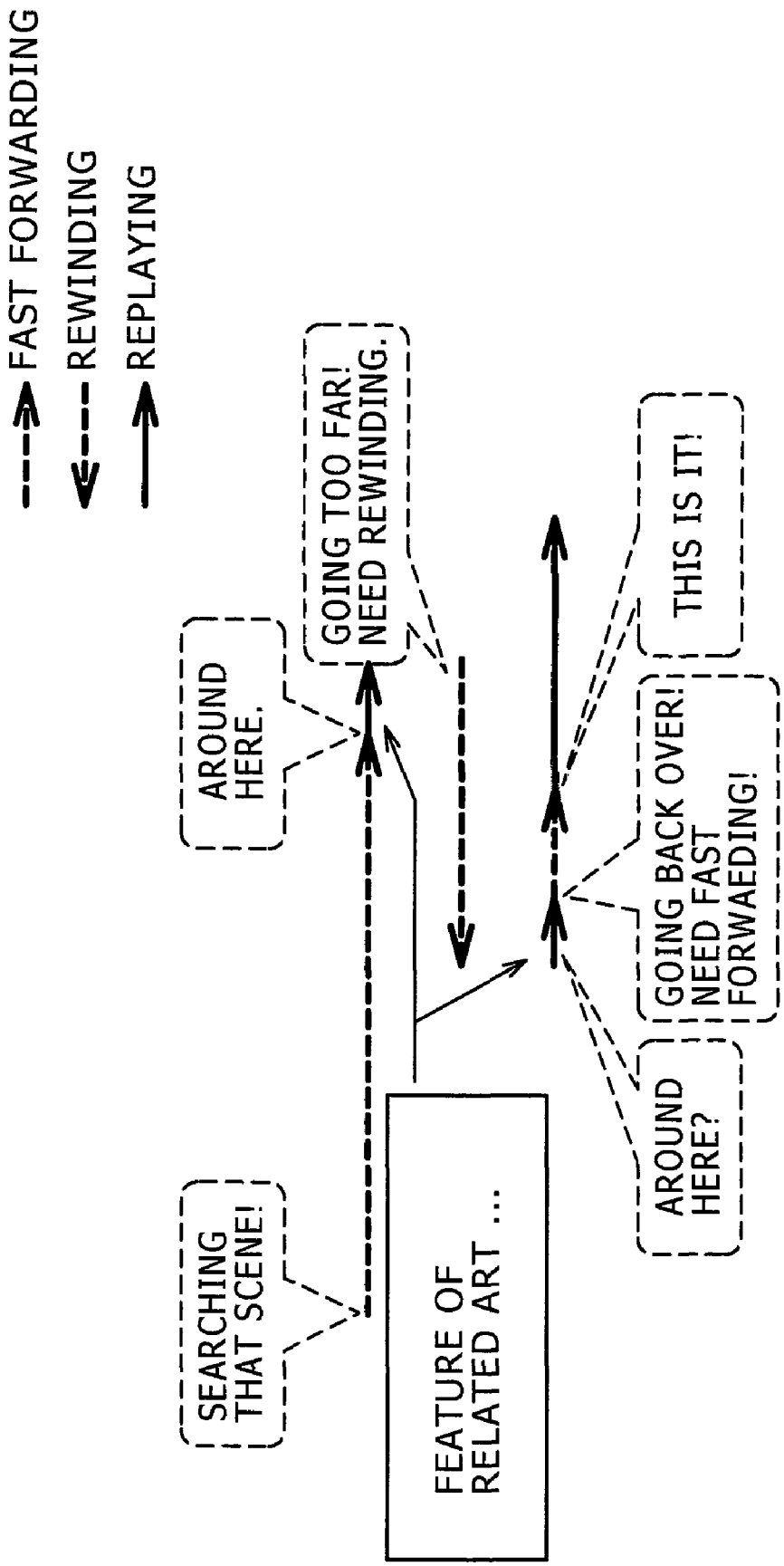

DEVICE AND METHOD FOR GIVING IMPORTANCE INFORMATION ACCORDING TO VIDEO OPERATION HISTORY

This application is a U.S. National Phase Application of PCT International Application PCT/JP2007/058783.

BACKGROUND OF THE INVENTION

1. Field of the Invention

The present invention relates to a device and a method for giving importance information to an important section according to a video operation history.

2. Description of the Related Art

Currently in an editing process of producing the program, a preview is performed to confirm whether a cut section available for the program exists in the picked up video through the user's viewing action, that is, the video operation such as fast forwarding, rewinding, and replaying. In the case where plural cut sections are contained in the video image, the video operations for "searching the desired video section", and "viewing the searched video section" are repeatedly performed. A series of video viewing action from operations to start "searching the desired video section" and "viewing the searched video section" to those to stop viewing the video will be referred to as a single preview.

The editing process may be roughly divided into two steps, that is, a rough edit step and a main edit step. In the rough edit step, the preview for confirming the cut section usable for the program is performed. In the main edit step, the cut section confirmed in the rough edit step is located to perform editing, for example, connecting the cut sections. The use of the two-stage edit process allows the program to be efficiently produced by performing the rough edit step with respect to the video image which has been picked up in advance, and then performing the main edit step upon completion of all the picked up images. In the rough edit step, In/Out points of the searched "cut section" are recorded by taking memos such that the video points of the "cut section" in the video image may be efficiently used for the main process. In the main edit step, the cue of the "cut section" is performed while confirming the recorded memo, thus requiring the video operations with fast forwarding and rewinding likewise the rough edit step.

In Japanese Unexamined Patent Application Publication No. 2000-331008, the video operation history (hereinafter referred to as a preview log) using the fast forwarding, rewinding, and replaying performed by the user for viewing the video is recorded, and the importance information is given to the section determined as being important according to the preview log. In Japanese Unexamined Patent Application Publication No. 2000-331008, the high importance information is given to all the replay section contained in the preview log where the video is replayed, which may be estimated to be the "section thoroughly viewed by the user". The higher importance information is given to the section where the video is repeatedly replayed or the video is rewound to be viewed again, which may be estimated to be the "section the user especially is interested in" such that the importance information is widely ranged depending on the feature of the operation. As the importance information is given to the video replay section considered to be important according to the preview log, and managed, the retrieving and editing of the important cut sections contained in the video may be efficiently performed.

The user's video viewing action (hereinafter referred to as preview) is formed of two types of video operations for the purpose of "searching the desired video section" and "viewing the searched video section". The video replay during the preview is performed for "confirming the current position for searching the desired section", or for "thoroughly viewing the searched video section". The video replay for "confirming the current position in the course of searching the desired image section" is less important because the producer of the program is not interested in such replay section, from a viewpoint of videos to be used in the program by the producer. In Japanese Unexamined Patent Application Publication No. 2000-331008, all the video replay sections are considered as those "thoroughly viewed" by the user. Accordingly, high importance information is given to the less important video replay section viewed for "confirming the current position while searching the desired video section" (see FIG. 29). Especially the section where the aforementioned video replay is repeatedly performed, or rewound to replay the video again may be considered as being the one in which "the viewer gets interested". Then the higher importance information may be given to such section. Accordingly, the high importance information is unnecessarily given to the replay section with less important, thus deteriorating efficiency for retrieving and editing the important cut section contained in the video image.

SUMMARY OF THE INVENTION

It is an object of the present invention to provide a device and a method for giving importance information according to the video operation history for detecting operation blocks for "searching desired video section" (hereinafter referred to as interest video searching operation block) from the preview log as the user's video operation history and eliminating operation blocks for "replaying to confirm the current position of the video while searching the desired video section" contained in the detected operation block such that the importance information is given to the replay section (hereinafter referred to as the user interest section) determined as the "replay for thoroughly viewing the searched video section".

Generally, the user performs fast forwarding for the purpose of searching the head of the desired video section (user interest section) to quickly access the video section while replaying at specific points for confirming the content of the stopped point. In this way, the user searches the user interest section while performing continual operation in one direction. The continual operation in one direction has two types, that is, the one mainly as fast forwarding formed of the fast forwarding, replaying, or a combination of the fast forwarding and replaying, and the other one mainly as rewinding formed of rewinding, or a combination of rewinding and replaying contained in the rewound section.

When the user performs the fast forwarding until the interest section is searched, it is likely to cause excessive forwarding over the desired video point to be replayed. As the fast forwarding is performed at the double speed, the excessive forwarding over the desired video point to be replayed may occur. In this case, the user performs the continual operation in the direction opposite the continual operation performed so far so as to recover the excessive forwarding. In other words, the continual operation mainly as rewinding is performed. The continual operation mainly as the rewinding operation may go back over likewise the over forwarding. In this case, the inverse continual operation, that is, the continual operation mainly as the fast forwarding will be performed. Generally, the user performs the continual operations in opposite directions alternately for searching the user interest section to gradually approach the head point thereof.

The continual operation mainly as the fast forwarding and the one mainly as the rewinding for searching the user interest section are correlated such that an interval from start to end of one continual operation includes the end time of the alternately performed other continual operation, or a start of one continual operation exists in an interval from start to end of the other continual operation previously operated. The user performs the video operation while taking care not to make the excessive operation, and is capable of obtaining the outline of the video viewed through the previous continual operation. Accordingly, the user plays the video at the position much closer to the user interest section compared with the previous operation. With the interest video searching operation blocks, the continual operation mainly as the fast forwarding and the continual operation mainly as the rewinding alternately performed such that the oppositely directed video continual operations are partially overlapped with each other with respect to time.

The interest video searching operation block always contains the minimum searching operation block as a minimum unit of the interest video searching operation block formed by combining the fast forwarding, rewinding and replaying. The interest video searching operation is formed by alternately performing the continual operation mainly as the fast forwarding and the continual operation mainly as the rewinding which are correlated with respect to time. So the minimum searching operation block is always generated at a transition between the oppositely directed continual operations mainly as the fast forwarding and as the rewinding. The minimum searching operation has oppositely directed operations partially overlapped with each other with respect to time likewise the correlation between the continual operations mainly as the fast forwarding and as the rewinding with respect to time. The minimum searching operation block may be divided into patterns A, B and C each having a predetermined operation feature.

In the present invention, the interest video search operations are detected using the aforementioned characteristics. The present invention provides a device for giving importance information according to a video operation history including an interest video searching operation block detection unit provided with a minimum searching operation block detection unit for detecting a minimum searching operation block as a minimum unit which exists in an interest video searching operation block from a preview log as a video operation history of a user, and a searching operation block setting unit for setting the interest video searching operation block through determination with respect to an operation previous and subsequent to the detected minimum searching operation block as a base point based on a feature of the interest video searching operation block. The interest video searching operation block may be detected by the interest video searching operation block detection unit such that the user interest section is obtained by eliminating the replay section contained in the interest video searching operation block from all the replay sections contained in the preview log. The importance information may be given to the thus detected user interest section.

The present invention provides a method for giving importance information according to a video operation history which includes the steps of detecting a minimum searching operation block as a minimum unit which exists in an interest video searching operation block from a preview log as a video operation history of a user based on patterns each having a predetermined operation feature, setting an interest video searching operation block through determination with respect to an operation previous and subsequent to the detected minimum searching operation block as a base point based on a feature of the interest video searching operation block, detecting a user interest section by eliminating a replay section contained in the interest video searching operation block from all the replay sections contained in the preview log, and giving the importance information to the detected user interest section.

The device and the method for giving importance information allow the interest image searching operation block to be detected from the preview log as the user's video operation history. As a result, operations to "replay for confirming the current position of the video while searching the desired video section" contained in the detected operation block may be eliminated. Then the importance information may be given to the video section used for the user to edit the program, that is, the user interest section. The user is allowed to retrieve only the video section desired by the user, thus improving the retrieving efficiency and editing efficiency.

The above objects and advantages of the present invention are described referring to the accompanying drawings, which will further be apparent by the following embodiment.

BRIEF DESCRIPTION OF THE DRAWINGS

FIG. 2 is a table showing a data structure of a preview log output from a preview log generation unit 102;

FIG. 5 graphically shows minimum searching operation blocks detected by a minimum searching operation block detection unit 401;

FIG. 11 is a flowchart of a process for detecting the minimum searching operation blocks based on a pattern B;

FIG. 13 is a table showing a data structure of the preview log output from the minimum searching operation block detection unit 401;

FIG. 15 is a table showing a data structure of the combined preview log having minimum searching operation blocks with patterns C and B overlapped;

FIG. 17 is a view showing a continual operation mainly as a fast forwarding operation;

FIG. 18 is a view showing a continual operation mainly as a rewinding operation;

FIG. 19 is a table showing a data structure of the preview log generated by the pattern C set unit 403;

FIG. 21 is a table showing a data structure of the combined preview log having minimum searching operation blocks with patterns A and B overlapped;

FIG. 24 is a table showing a data structure of the preview log generated in the pattern A/B forward setting process;

FIG. 25 is a table showing a data structure of the preview log generated in the pattern A/B backward setting process;

FIG. 26 is a table showing a data structure of the preview log output from the interest video searching operation block detection unit 103;

FIG. 27 is a table showing a data structure of the preview log output from the user interest section detection unit 104;

FIG. 28A is a table showing a data structure of the preview log output from an importance information giving unit 105;

FIG. 28B shows an importance information table managed by the importance information giving unit 105; and FIG. 29 graphically shows an operation for giving importance information to all the replay sections contained in the preview log (Japanese Unexamined Patent Application Publication No. 2000-331008).

DESCRIPTION OF THE PREFERRED EMBODIMENT

Figure 1:
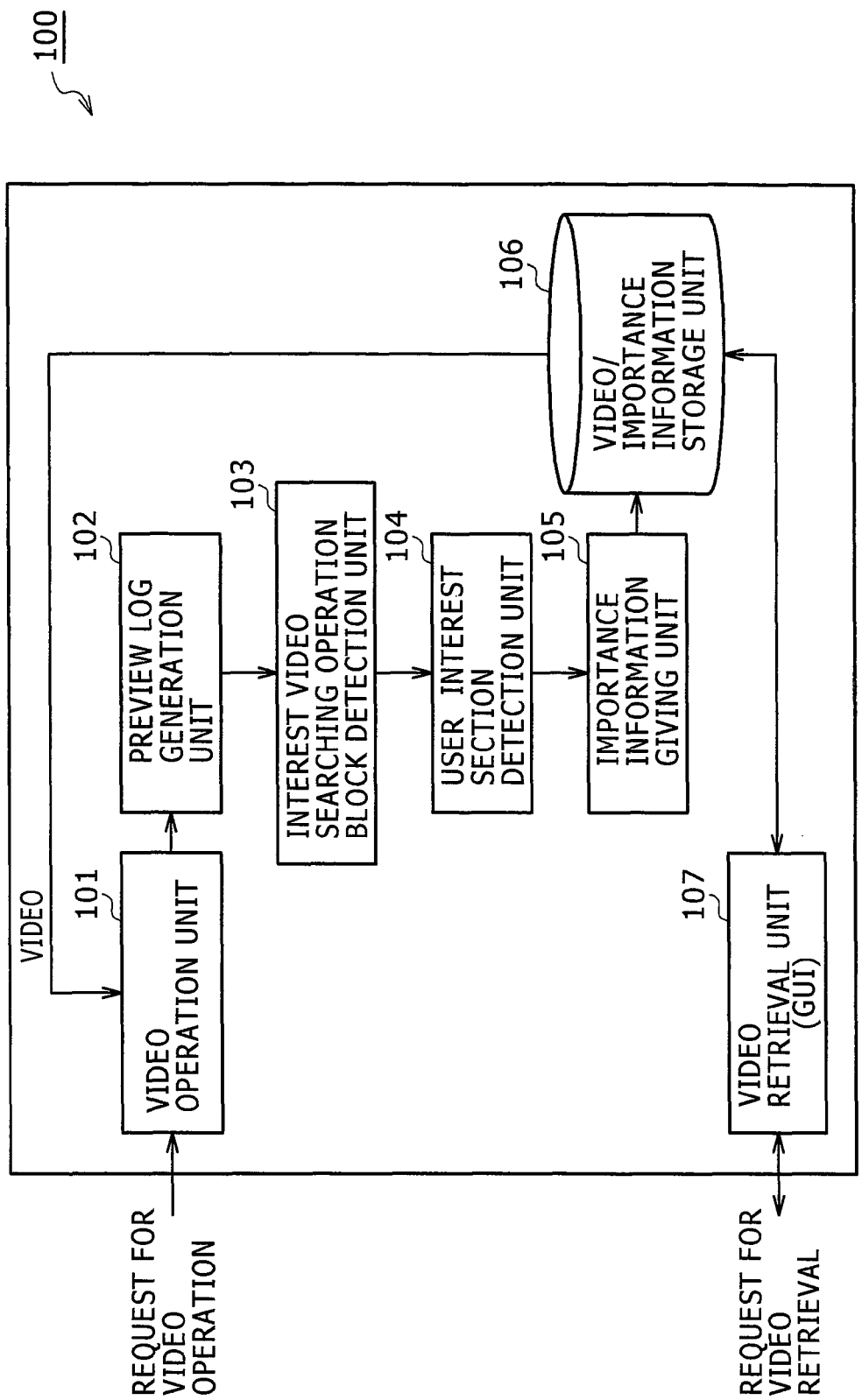
FIG. 1 is a block diagram showing an inner structure of a device 100 for giving importance information according to a video operation history for an embodiment of the present invention.

An embodiment of the present invention will be described. FIG. 1 is a block diagram showing an inner structure of an importance information giving device according to a video operation history according to an embodiment. Referring to FIG. 1, an importance information giving device 100 includes a video operation unit 101 for performing a video operation in response to a video operation request through fast forwarding, rewinding, replaying and the like performed by a user, a preview log generation unit 102 for generating a video operation history (hereinafter referred to as a preview log) according to the video operation performed by the video operation unit 101, an interest video searching operation block detection unit 103 for detecting the video operation block (hereinafter referred to as an interest video searching operation block) performed by the user from the preview log generated by the preview log generation unit 102 until the interest video section is reached, a user interest section detection unit 104 for detecting a user interest section by eliminating a replay section contained in the interest video searching operation block detected by the interest video searching operation block detection unit 103 from all the replay sections contained in the preview log, an importance information giving unit 105 for giving importance information to the user interest section detected by the user interest section detection unit 104, a video/importance information storage unit 106 for storing the importance information given by the importance information giving unit 105 together with the video image, and a video retrieval unit (GUI) 107 for retrieving the video and the importance information stored in the video/importance information storage unit 106 in response to a user's request for video retrieval.

Figure 3:
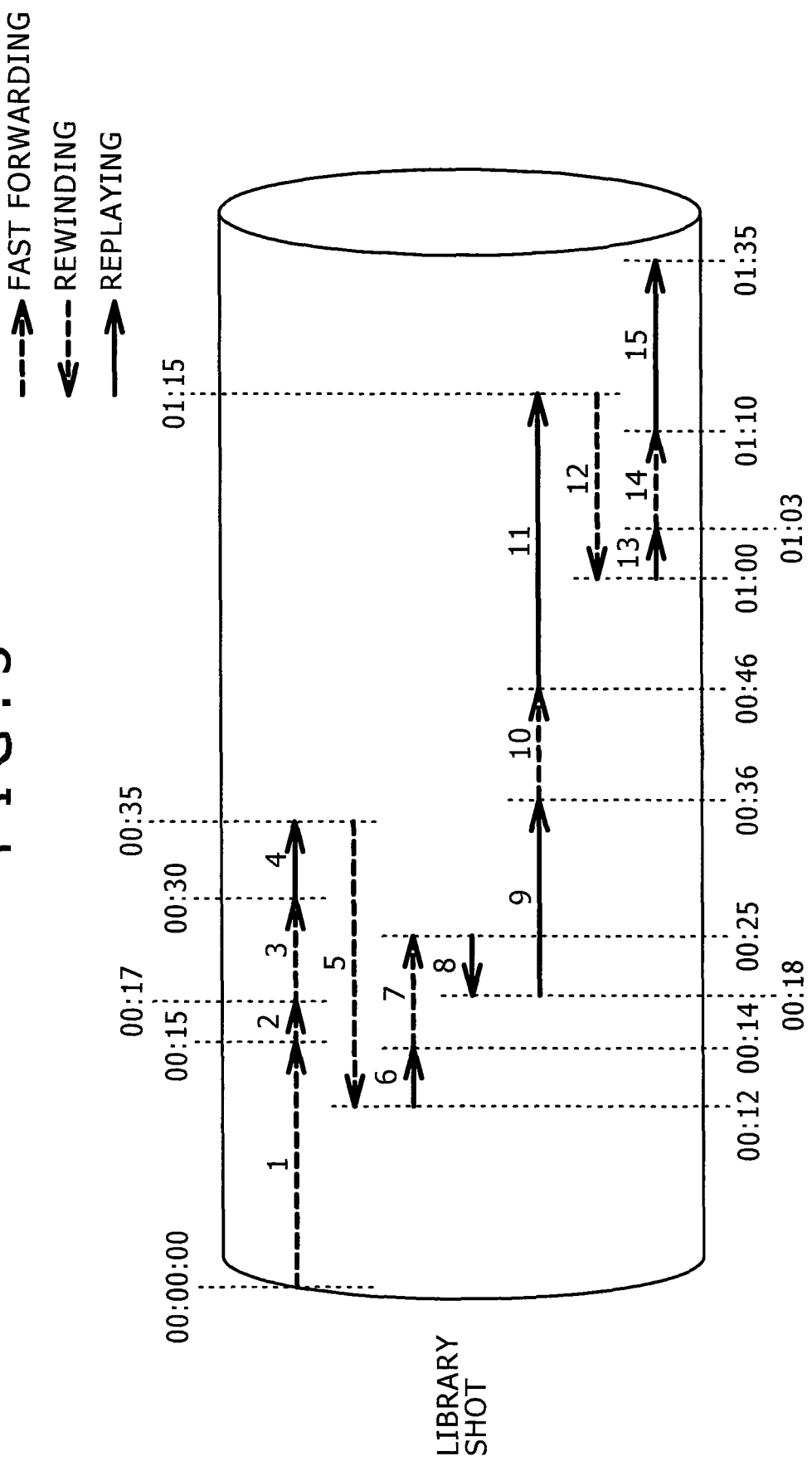
FIG. 3 graphically shows the preview log output from the preview log generation unit 102.

A data structure of the preview log will be described referring to FIG. 2. Referring to FIG. 2, the data structure of the preview log is used to control "operation number" allocated to a single operation, "operation type" indicating a content of the operation, for example, replaying, fast forwarding, rewinding and the like, "operation type number" which represents each operation type by the number, "operation direction" which represents forward/backward direction of the operation, "In point" as a point indicating an operation starting point on the video image, and "Out point" as a point indicating an operation end point on the video image. The preview log generates single data formed of the operation type, the operation type number, the operation direction, the operation starting point (In point) and the operation end point (Out point) by each operation, and further generates those data continuously until all the video operations are finished while performing the video operations repeatedly for establishing two objects, that if, "searching the desired video section" and "viewing the searched video section". FIG. 3 graphically shows the data structure of the generated preview log.

Figure 4A:
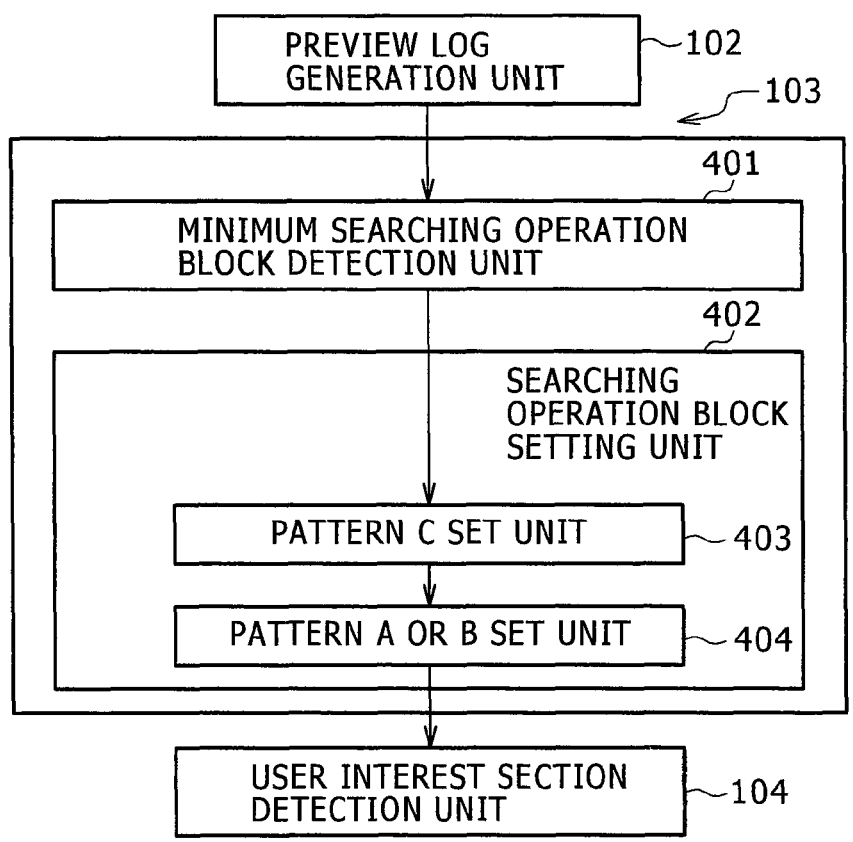
FIG. 4A is a block diagram showing an inner structure of an interest video searching operation block detection unit 103.
Figure 4B:
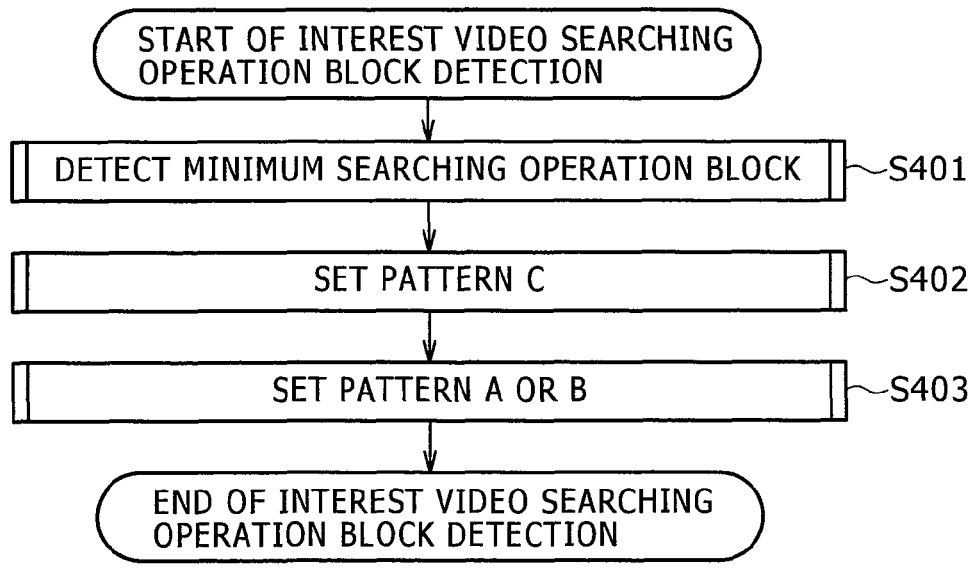
FIG. 4B is a flowchart of a process executed in the interest video searching operation block detection unit 103.

The process for detecting interest video searching operation blocks from the preview log performed by the interest video searching operation block detection unit 103 will be described referring to FIGS. 4A and 4B. FIG. 4A is a block diagram showing the inner structure of the interest video searching operation block detection unit 103. FIG. 4B is a flowchart of a process executed in the interest video searching operation block detection unit 103. Referring to FIG. 4A, the interest video searching operation block detection unit 103 includes a minimum searching operation block detection unit 401 which determines the minimum searching operation block as a minimum unit which always exists in the interest video searching operation block from the preview log based on the patterns A, B and C each having a predetermined operation feature so as to be detected, and a searching operation block set unit 402 which determines the previous and subsequent operations of the minimum searching operation block based on the feature of the interest video searching operation block, which has the detected minimum searching operation block as a base point to set the interest video searching operation block based on the feature of the interest video searching operation block.

The minimum searching operation block detection unit 401 detects the minimum searching operation block which always exists in the interest video searching operation block through determination based on the patterns A, B and C each having the predetermined operation feature. With the pattern A, rewinding is performed immediately after fast forwarding or fast forwarding/replaying, and the end point (Out point) of the rewinding operation is contained in a range from start to end of the fast forwarding or fast forwarding/replaying. With the pattern B, the fast forwarding or replaying/fast forwarding is performed immediately after the rewinding, and the end point (Out point) of the fast forwarding or replaying/fast forwarding is contained in the interval from start to end of the rewinding. With the pattern C, the rewinding is performed immediately after the replaying, and the end point (Out point) of the rewinding exists in the interval from start to end of the replaying. Specifically, the minimum searching operation block detection unit 401 detects the "operation having oppositely directed video operations overlapped with each other with respect to time" through determination based on each feature of the respective patterns A, B and C as the minimum searching operation block serving as a base point for detecting the interest video searching operation block. The process performed in the minimum searching operation block detection unit 401 corresponds with the process in step 401 shown in FIG. 4B. FIG. 5 shows the minimum searching operation blocks indicated by dotted lines. Referring to FIG. 5, the minimum searching operation block is formed as a tiny triangle as an overlapped section of oppositely directed video operations with respect to time.

Figure 6:
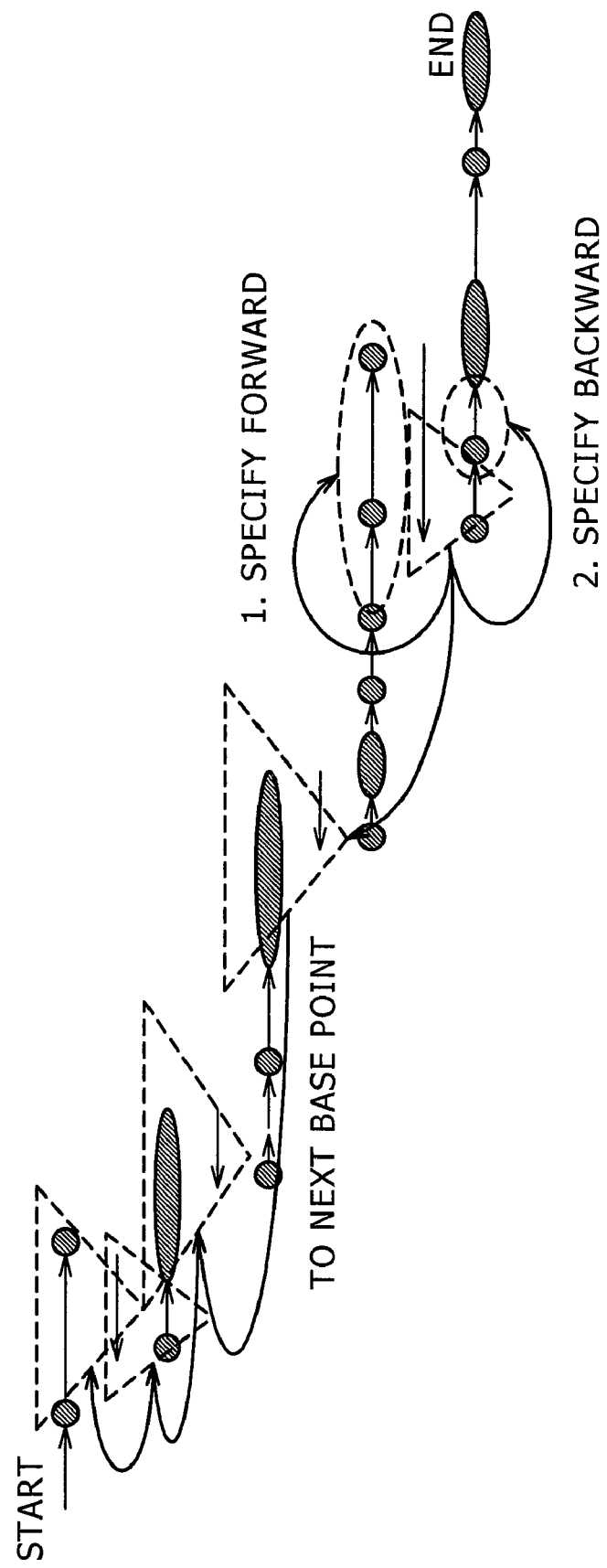
FIG. 6 graphically shows a process for setting the interest video searching operation blocks.
Figure 7:
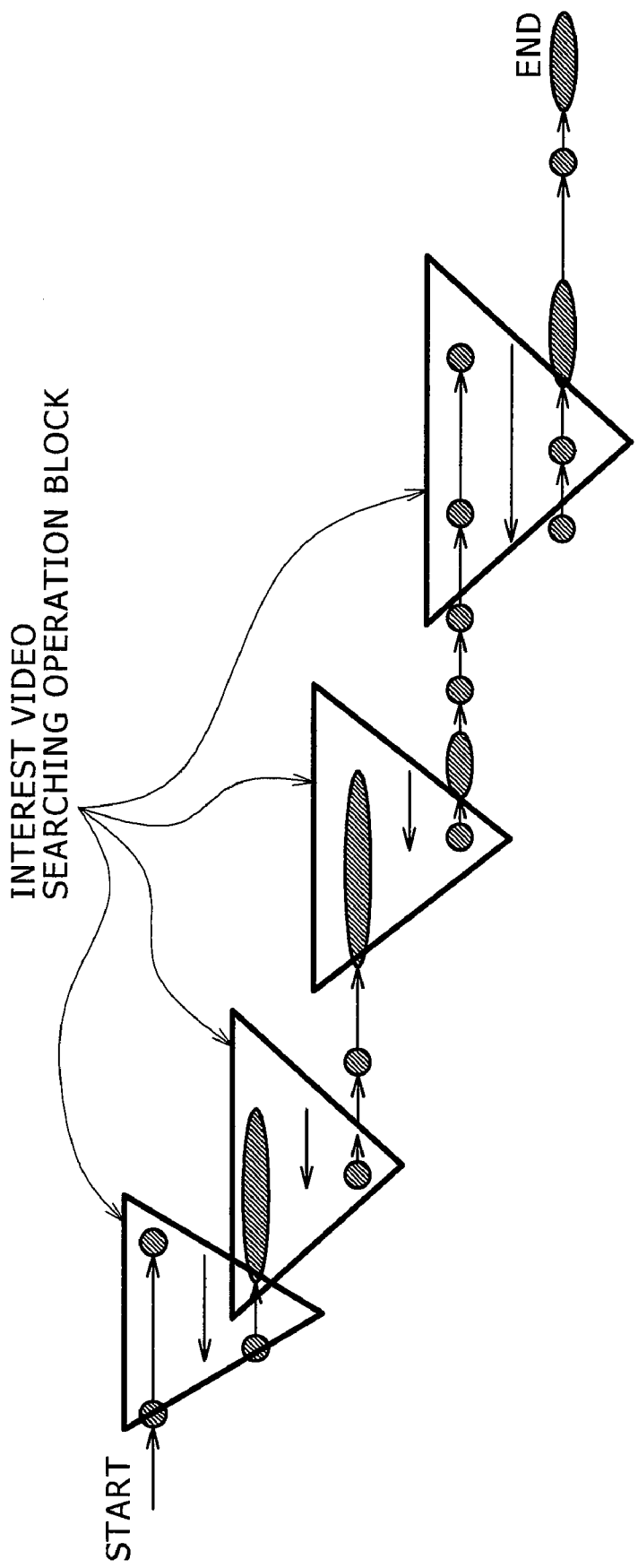
FIG. 7 graphically shows the set interest video searching operation blocks.
Figure 8:
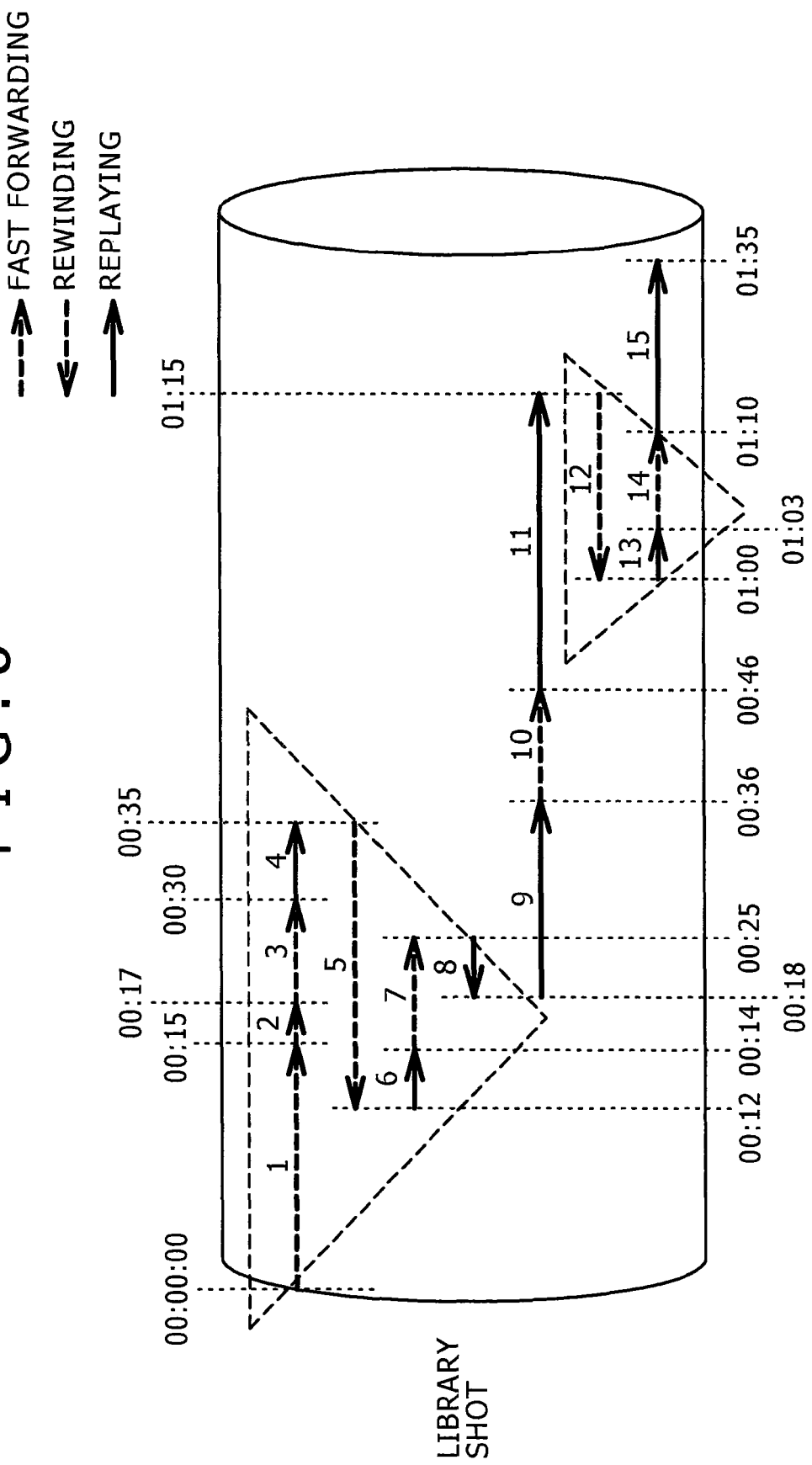
FIG. 8 graphically shows the interest video searching operation blocks output from the interest video searching operation block detection unit 103.

The searching operation block set unit 402 includes a pattern C set unit 403 and a pattern A/B set unit 404. The pattern C set unit 403 determines the operation subsequent to the minimum searching operation block based on the feature of the interest video searching operation block having the minimum searching operation block with the pattern C detected by the minimum searching operation block detection unit 401 as the base point so as to set the interest video searching operation block. The pattern A/B set unit 404 determines operations previous and subsequent to the minimum searching operation block based on the feature of the interest video searching operation block having the minimum searching operation block with the pattern A or B detected by the minimum searching operation block detection unit 401 as the base point so as to set the interest video searching operation block. Specifically, the searching operation block set unit 402 performs the continual operation mainly as the fast forwarding and the continual operation mainly as the rewinding alternately as features of the interest searching video operation block using the operation type and the starting time and the end time of the operation shown in the preview log with respect to the operations previous and subsequent to the base point, that is, the minimum searching operation block detected by the minimum searching operation block detection unit 401. The determination is made with respect to the correlation where an interval from start to end of one continual operation includes an end time of the other continual operation subsequently performed, or the starting time of one continual operation exists in an interval from start to end of the other continual operation previously operated. In other words, the determination is made with respect to the "correlation where the oppositely directed continual operations of video are overlapped with each other with respect to time". The interest video searching operation block is set based on the determination. The searching operation block set unit 402 sets the interest video searching operation block in the order of the pattern C, and the pattern A or B. The process performed in the pattern C set unit 403 corresponds with the process in step 402 shown in FIG. 4B, and the process performed in the pattern A/B set unit 404 corresponds with the process in step 403. FIG. 6 shows how the interest image searching operation block is set. Referring to FIG. 6, the video searching operation block sets the operations previous and subsequent to the minimum searching operation blocks in the order from the base point closer to the end of the video. FIGS. 7 and 8 show the interest video searching operation blocks. Referring to FIGS. 7 and 8, the interest video searching operation block is formed as an inverted triangle larger than the minimum searching operation block (see FIG. 5). In this way, the transition from the minimum searching operation block detected by the minimum searching operation block detection unit 401 to the interest video searching operation block allows the operation for "searching the desired video section" to be set. The drawings indicate the overlapped portion between the oppositely directed continual operations of video with respect to time.

Figure 9:
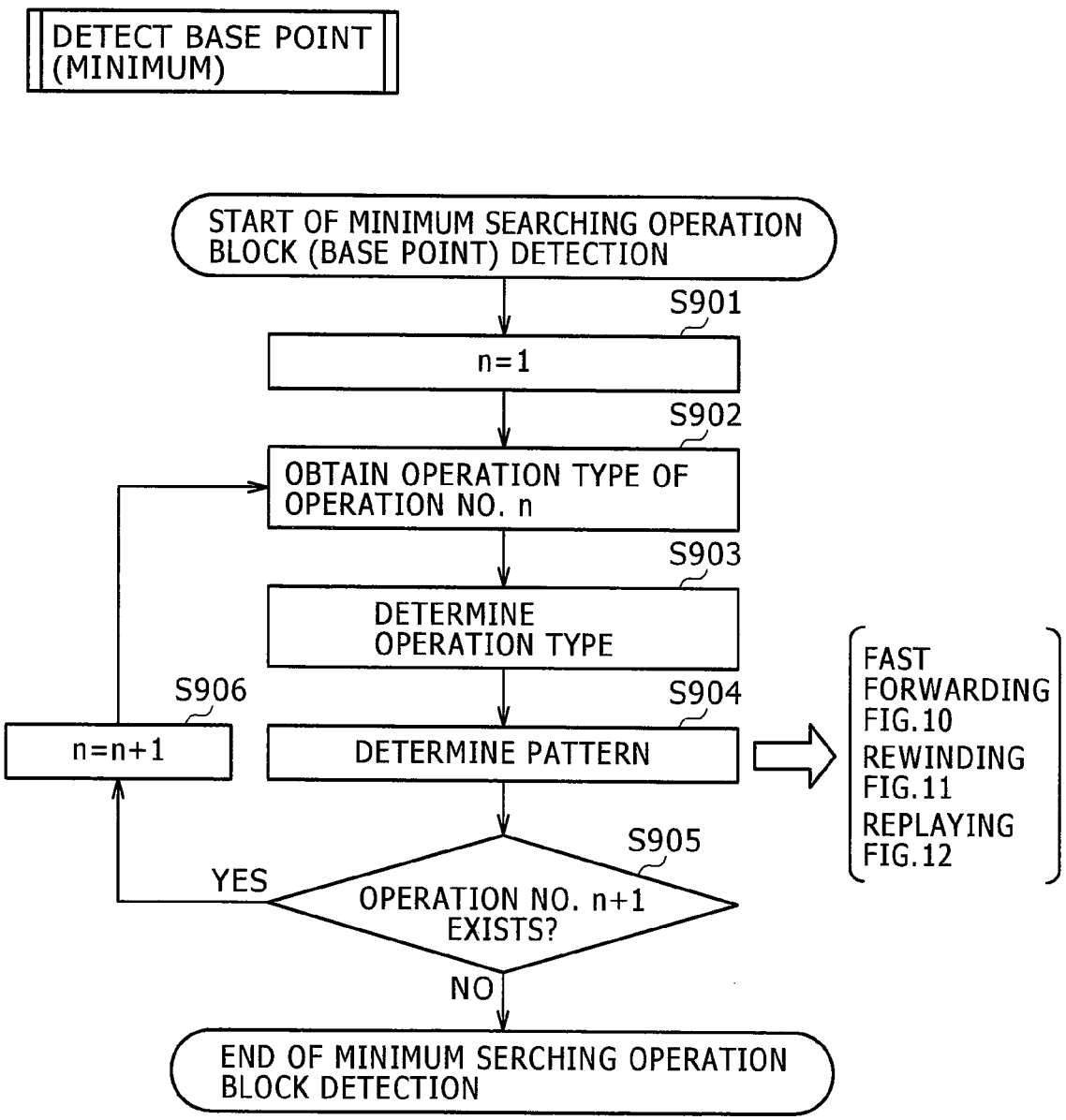
FIG. 9 is a flowchart of a process executed in a minimum searching operation block detection unit 401.
Figure 10:
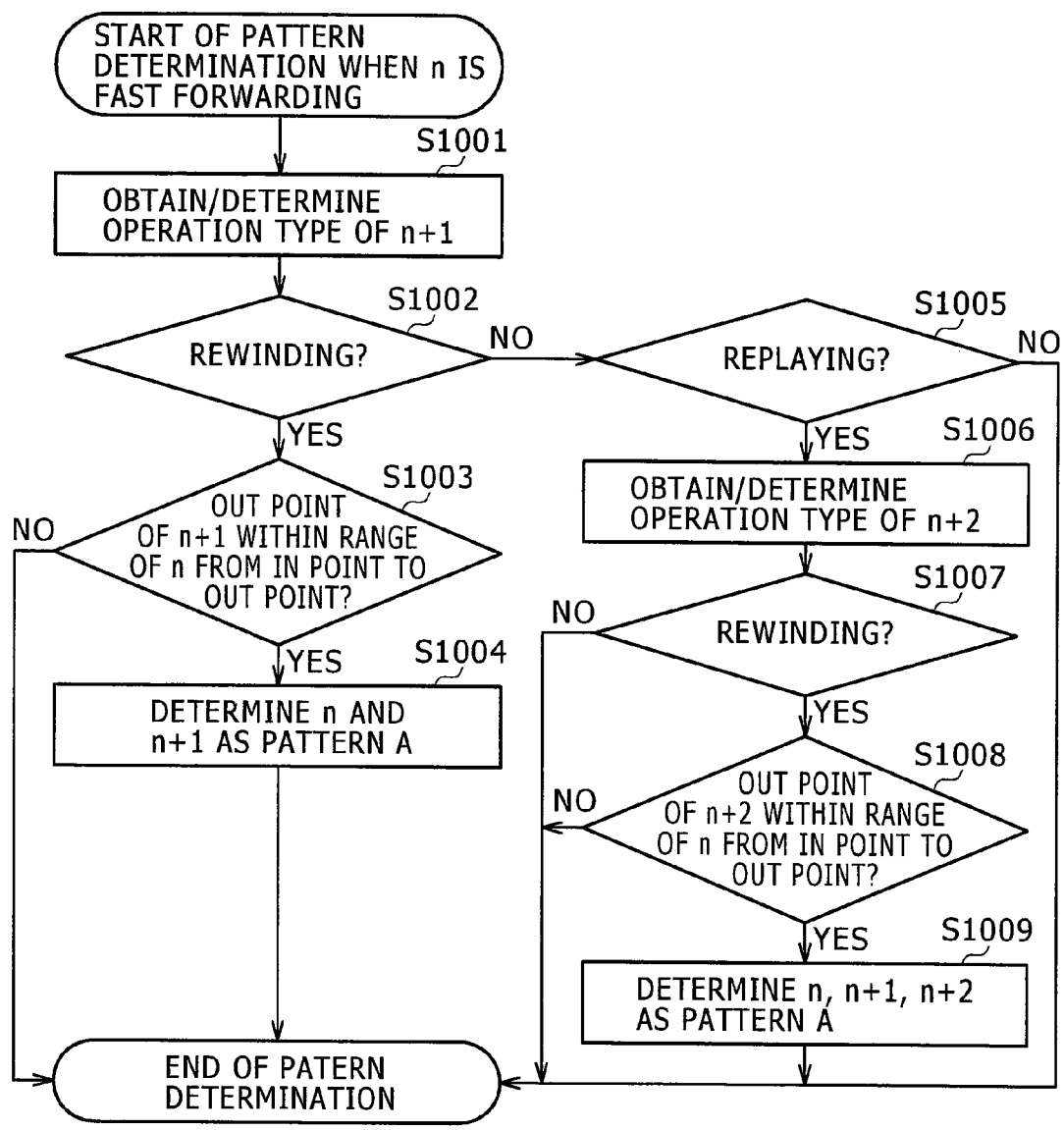
FIG. 10 is a flowchart of a process for detecting the minimum searching operation blocks based on a pattern A.
Figure 12:
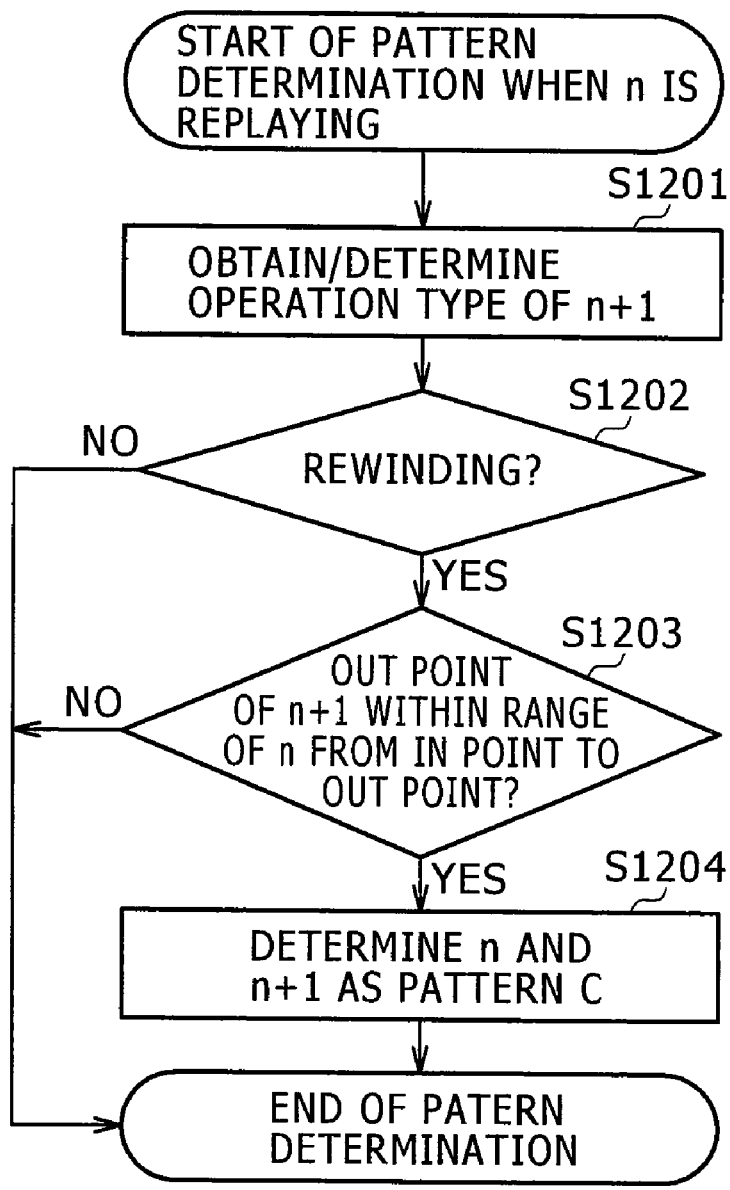
FIG. 12 is a flowchart of a process for detecting the minimum searching operation blocks based on a pattern C.

FIG. 9 is a flowchart of the process for detecting the minimum searching operation block in the minimum searching operation block detection unit 401 through determination based on the respective patterns each with a predetermined operation feature. When starting detection of the minimum searching operation block (START), the operation number "n=1" is retrieved (step 901). The operation type of the operation with the number is obtained (step 902), and is determined (step 903). Based on the determined operation type, the pattern determination is made (step 904). Specifically, when the operation type is the fast forwarding, the determination with the pattern A shown in FIG. 10 is performed. When the operation type is the rewinding, the determination with the pattern B shown in FIG. 11 is performed. When the operation type is the replaying, the determination with the pattern C shown in FIG. 12 is performed. The pattern is determined with respect to the operation number "n=1", and then it is determined whether the operation number "n+1" exists. When it exists, the operation number n is set to n+1, and the process returns to step S902 where the same process as described above is performed. Meanwhile, when it does not exist, the process ends (END). FIG. 13 shows the data structure of the preview log generated by the minimum searching operation block detection unit 401.

The pattern A determination process performed when the operation type determined in step 903 is the fast forwarding will be described referring to FIG. 10. The pattern A determination is performed based on the operation feature of the pattern A. It is determined whether or not the rewinding is performed immediately after the fast forwarding, or fast forwarding/replaying, and the end point of the rewinding exists in an interval from start to end of the fast forwarding or fast forwarding/replaying.

When the operation number "n" is the fast forwarding (START), the operation type of the operation number "n+1" is obtained and determined (step 1001). When the operation type of the operation number "n+1" is the rewinding (step 1002), it is determined whether or not Out point of the operation number "n+1" exists in an interval from In point to Out point (step 1003) of the operation number "n". When it exists, the operation numbers "n" and "n+1" are determined as the pattern A and the process ends (step 1004, END). Meanwhile, when Out point of the operation number "n+1" does not exist in the interval from In to Out points of the operation number "n", it is not determined as the pattern A and the process ends (step 1003, END). Meanwhile, when the operation type of the operation number "n+1" is the replaying rather than the rewinding (step 1005), the operation type of the operation number "n+2" is obtained so as to be determined (step 1006). Meanwhile, when the operation type of the operation number "n+1" is not the rewinding or the replaying, it is not determined as the pattern A and the process ends (step 1005, END). When the operation type of the operation number "n+2" determined in step 1006 is the rewinding (step 1007), it is determined whether or not the Out point of the operation number "n+2" exits in an interval from In point to Out point of the operation numbers (step 1008). When it exists, the operation numbers "n", "n+1" and "n+2" are determined as the pattern A, and the process ends (step 1009, END). Meanwhile, if the Out point of the operation number "n+2" does not exist in an interval from In point to Out point of the operation number "n", it is not determined as the pattern A, and the process ends (step 1008, END). When the operation type of the determined operation number "n+2" is not rewinding, it is not determined as the pattern A, and the process ends (step 1007, END). The pattern A is determined in the aforementioned steps. For example, the operation with operation numbers 7 and 8 will be determined as the pattern A as shown in FIG. 13.

The pattern B determination process performed when the operation type determined in step 903 is the rewinding will be described referring to FIG. 11. The pattern B determination is performed based on the operation feature of the pattern B. It is determined whether or not the fast forwarding or replaying/ fast forwarding is performed immediately after the rewinding, and the end point of the fast forwarding or replaying/fast forwarding exists in an interval from start to end of the rewinding.

When the operation number "n" is the rewinding (START), the operation type of the operation number "n+1" is obtained and determined (step 1101). When the operation type of the operation number "n+1" is the fast forwarding (step 1102), it is determined whether or not Out point of the operation number "n+1" exists in an interval from In point to Out point (step 1103). When it exists, the operation numbers "n" and "n+1" are determined as the pattern B and the process ends (step 1104, END). Meanwhile, when the Out point of the operation number "n+1" does not exist in the interval from In point to Out point of the operation number "n", it is not determined as the pattern B, and the process ends (step 1103, END). When the operation type of the operation number "n+1" is the replaying rather than the fast forwarding (step 1105), the operation type of the operation number "n+2" is obtained so as to be determined (step 1106). Meanwhile, when the operation type of the operation number "n+1" is not the fast forwarding nor replaying, it is not determined as the pattern B and the process ends (step 1105, END). When the operation type of the operation number "n+2" determined in step 1106 is the fast forwarding (step 1107), it is determined whether or not the Out point of the operation number "n+2" exists in the interval from In point to Out point of the operation number "n" (step 1108). When it exists, the operation numbers "n", "n+1" and "n+2" are determined as the pattern B and the process ends (step 1109, END). Meanwhile, when the Out point of the operation number "n+2" does not exist in the interval from In point to Out point of the operation number "n", it is not determined as the pattern B, and the process ends (step 1108, END). When the operation type of the determined operation number "n+2" is not the fast forwarding, it is not determined as the pattern B, and the process ends (step 1107, END). The pattern B is determined in the aforementioned steps. For example, the operations with operation numbers 5, 6, 7, 12 and 13 will be determined as the pattern B as shown in FIG. 13.

The pattern C determination process performed when the operation type determined in step 903 is the replaying will be described referring to FIG. 12. The pattern C determination is performed based on the operation feature of the pattern C. It is determined whether or not the rewinding is performed immediately after the replaying, and the end point of the rewinding exists in an interval from start to end of the replaying.

When the operation type of the operation number "n" is the replaying (START), the operation type of the operation number "n+1" is obtained and determined (step 1201). When the operation type of the operation number "n+1" is the rewinding (step 1202), it is determined whether or not the Out point of the operation number "n+1" exists in an interval from In point to Out point of the operation number "n" (step 1203). When it exists, the operation numbers "n" and "n+1" are determined as the pattern C and the process ends (step 1204, END). Meanwhile, when the Out point of the operation number "n+1" does not exist in the range from In point to Out point of the operation number "n", it is not determined as the pattern C, and the process ends (step 1203, END) When the operation type of the operation number "n+1" is not the rewinding, it is not determined as the pattern C and the process ends (step 1202, END). The pattern C is determined in the aforementioned steps. For example, the operations with operation numbers 11 and 12 will be determined as the pattern C as shown in FIG. 13.

The process for setting the interest video searching operation block by determining, based on the feature of the interest video searching operation block, the operations previous and subsequent to the minimum searching operation block detected by the respective patterns as the base point, which is performed in the searching operation block set unit 402 will be described. The pattern C where the rewinding is performed immediately after replaying, and the end point (Out point) of the rewinding exists in the interval from start to end of the replaying is required to be set first as it may be contained in the pattern A or B. Specifically, in the embodiment, the interest video searching operation block is first set with the pattern C, and then with the pattern A or B.

Figure 14:
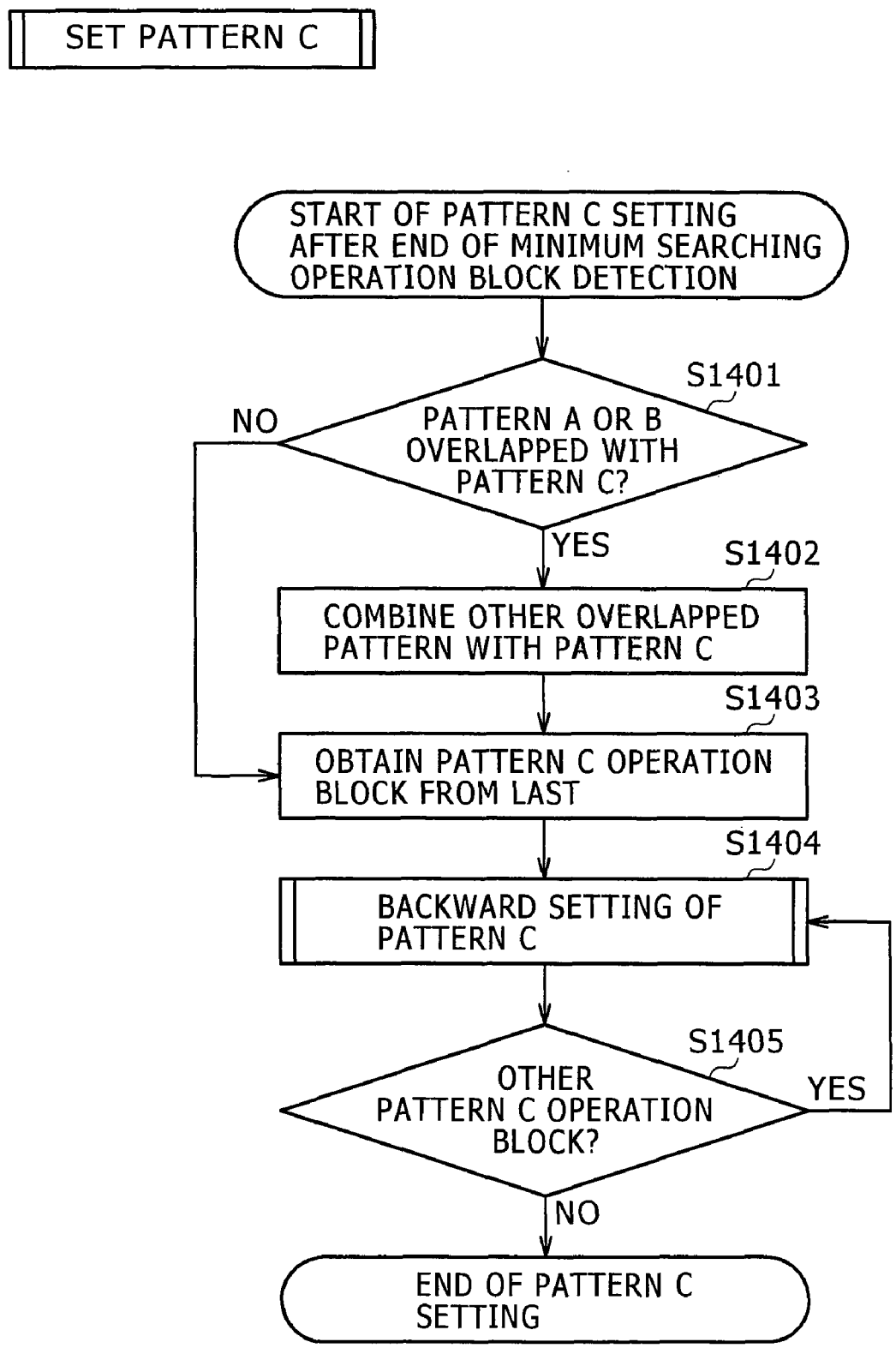
FIG. 14 is a flowchart of a process executed in a pattern C set unit 403.

The process performed in the pattern C set unit 403 will be described referring to FIG. 14. After detection of the minimum searching operation block in the minimum searching operation block detection unit 401, the pattern C set process is started (START). It is determined whether or not the minimum searching operation block with pattern A or B is overlapped with that of the pattern C (step 1401). When the overlapped portion exists, the overlapped pattern A or B is combined with the pattern C (step 1402). When the overlapped portion does not exist, the process proceeds to step 1403. FIG. 15 shows the data structure of the preview log generated in step 1402. As the operation number 12 has the patterns C and B overlapped (see FIG. 13), they are determined as the same interest video searching operation blocks. Then the pattern B is combined with the pattern C by replacing the flag so as to become the operation block with the pattern C (see FIG. 15). An arbitrary flag may be replaced so long as the same interest video searching operation block is identifiable.

Then the pattern C operation blocks are sequentially obtained from the last of the preview log (step 1403) to perform the pattern C backward setting (step 1404). With the pattern C backward setting, the operation subsequent to the pattern C operation block is subjected to determination whether or not an interval from start to end of a continual operation contained in the obtained pattern C operation block includes an end time of the other continual operation subsequently performed based on the feature of the interest video searching operation block to perform backward setting of the pattern C interest video searching operation block. Specifically, it is determined whether or not the operation subsequent to the pattern C operation block satisfies the condition where "the continual operation mainly as the fast forwarding and the continual operation mainly as the rewinding are alternately performed, and the oppositely directed continual operations of video are partially overlapped with each other with respect to time". When a the condition is satisfied, the pattern C operation block is extended to perform the process repeatedly until the operation which satisfies the condition is not detected, and the backward setting of the interest video searching operation block with the pattern C is performed. Meanwhile, when the condition is not satisfied, the operation block with the pattern C is not extended and the backward setting of the interest video searching operation block with the pattern C is performed.

The backward setting of the pattern C is performed in step 1404, and it is determined whether or not the other operation block with the pattern C exists (step 1405). When it exists, the process returns to step 1404 where the same process will be performed. Meanwhile, when it does not exist, the process ends (END). FIG. 19 shows a data structure of the preview log generated by the pattern C set unit 403. In the embodiment, the backward setting of the interest video searching operation block with pattern C is performed without extending the pattern C operation block.

Figure 16:
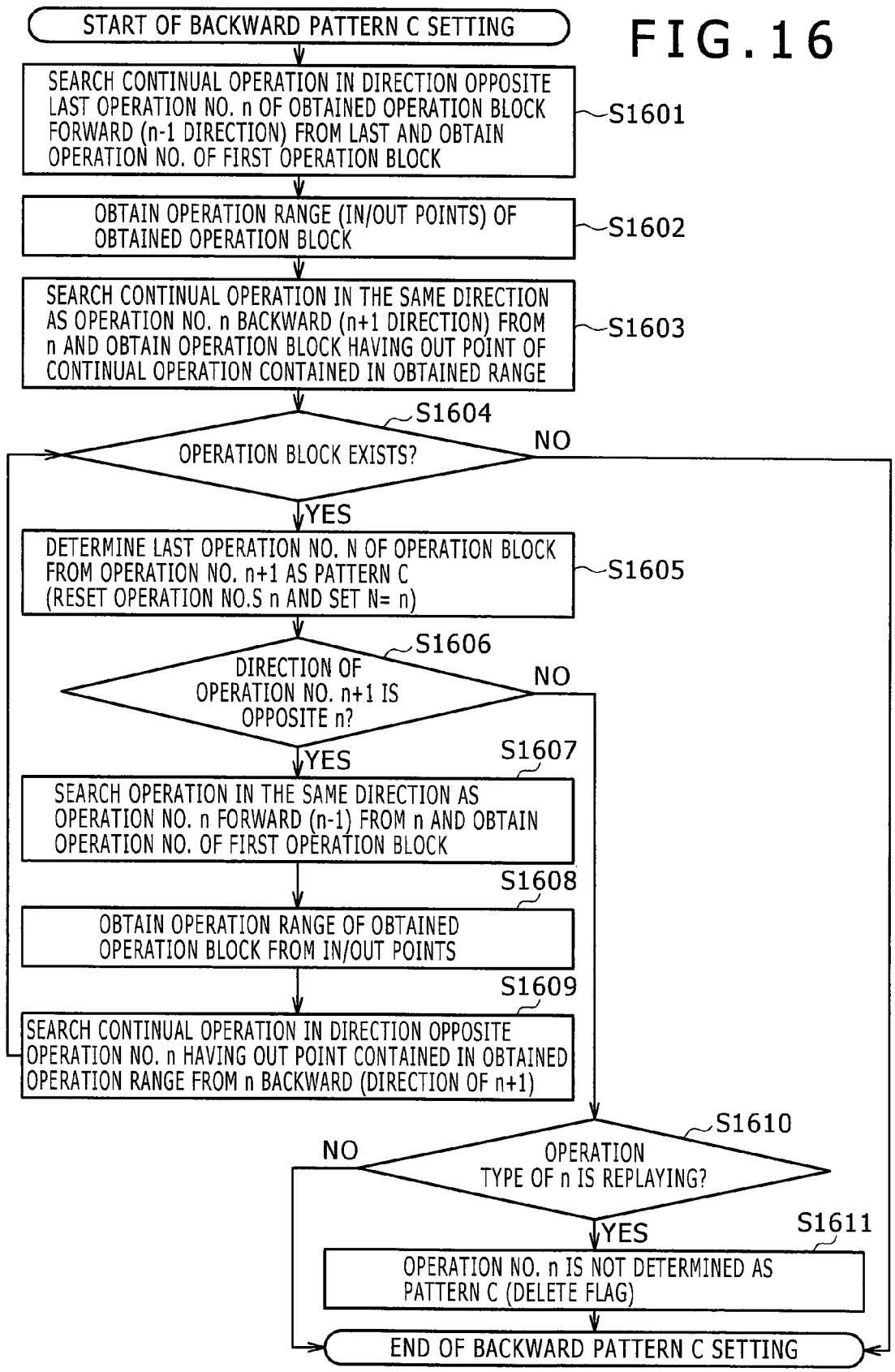
FIG. 16 is a flowchart of a pattern C backward setting process.

The process for performing the pattern C backward setting in step 1404 will be described referring to FIG. 16. Upon start of the pattern C backward setting (START), the continual operation in the direction opposite the direction of the operation number n at the last of the obtained pattern C operation block is searched forward (n−1 direction) from the last. The operation number of the first operation block is obtained (step 1601). Then the operation range of the operation block is obtained from In and Out points (step 1602). The continual operation denotes the one performed in one direction, which includes a continual operation of the fast forwarding or a combination of fast forwarding and replaying mainly as the fast forwarding operation as shown in FIG. 17, and a continual operation of rewinding or a combination of rewinding and replaying contained in the rewinding interval, mainly as the rewinding operation as shown in FIG. 18. In the embodiment, the operation number 12 is obtained, and the In point "00:01:15" and Out point "00:01:00" are obtained. Then the continual operation in the same direction as the operation number n having the Out point existing in the obtained operation range is searched backward (n+1 direction) from the operation number n (step 1603). It is determined whether or not the operation block exists (step 1604). When the operation block exists, the operation numbers from n+1 to N as the last of the operation block are determined as the pattern C (step 1605). When the operation block does not exist, the pattern C backward setting ends (END). In the embodiment, the process ends after detecting that the operation block does not exist. After the operation numbers from n+1 to N as the last of the operation block are determined as the pattern C in step 1605, the previous number n is reset to be replaced by N.

After the operation number n is determined as the pattern C in step 1605, it is determined whether or not the operation numbers n+1 and n are oppositely directed (step 1606). When they are oppositely directed, the operation in the same direction as the operation number n is searched forward (n−1) from the number n, and the operation number of the first operation block is obtained (step 1607). The operation range of the operation block is obtained from the In point and the Out point (step 1608). The continual operation in the direction opposite the operation number n having the Out point existing in the obtained operation range is searched backward (n+1 direction) from the operation number n (step 1609). Thereafter, the same process as described above is performed. Meanwhile, when the operation numbers n+1 and n are not oppositely directed in step 1606, it is determined whether or not the operation type of the operation number n is the replaying (step 1610). When it is the replaying, the operation number n determined as the pattern C is not determined as the pattern C, and the flag is deleted (step 1611). The backward setting of the pattern C then ends (END). Meanwhile, when it is not replaying, the backward setting of the pattern C ends (END). The pattern C backward setting is performed in the aforementioned steps.

Figure 20:
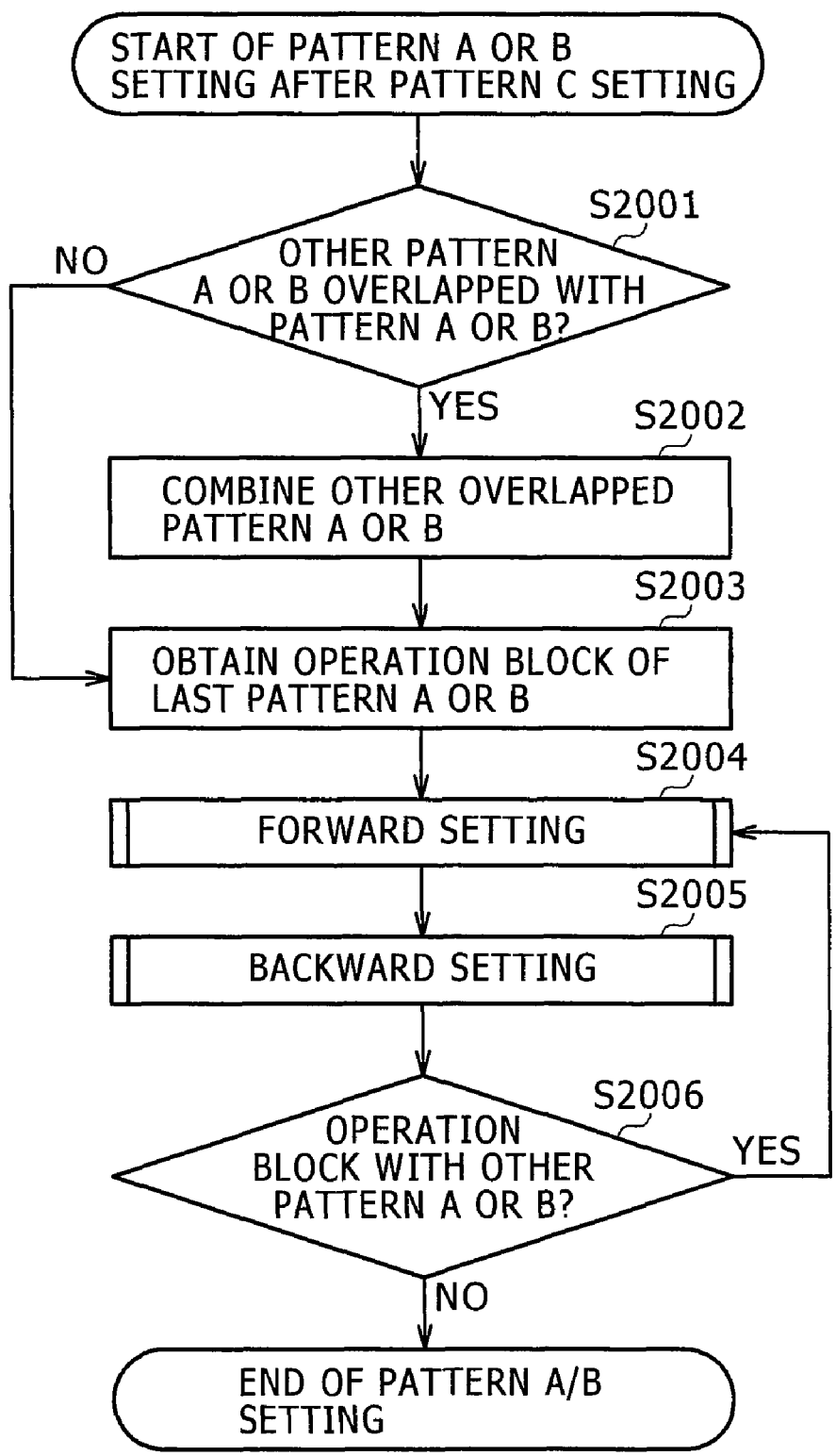
FIG. 20 is a flowchart of a process executed in a pattern A/B set unit 404.

The process performed in the pattern A/B set unit 404 will be described referring to FIG. 20. Upon start of the pattern A/B set process after completion of the pattern C setting (START), it is determined whether or not the minimum searching operation block with pattern A/B overlapped with the other one with pattern A/B exists (step 2001). When it exists, the overlapped pattern A/B is combined with the other pattern A/B (step 2002). Meanwhile, when it does not exist, the process proceeds to step 2003. The data structure of the preview log generated in step 2002 is shown in FIG. 21. As the operation number 7 has the patterns B and A overlapped (see FIG. 19), they are determined as being the same interest video searching operation blocks. Then the pattern A is combined with the pattern B, and the flag is replaced to be the operation block with the pattern A/B (see FIG. 21). Any flag may be replaced so long as the same interest video searching operation block is identifiable.

Thereafter, the operation blocks each with the pattern A/B are sequentially obtained from the last of the preview log(step 2003), and the pattern A/B forward setting is performed (step 2004). With the pattern A/B forward setting, the operation previous to the pattern A/B operation block is subjected to the determination based on the feature of the interest video searching operation block whether or not a starting time of one continual operation contained in the obtained pattern A/B operation block exists in an interval from start to end of the other continual operation previously performed to perform the forward setting with respect to the pattern A/B interest video searching operation block. It is determined whether or not the operation previous to the pattern A/B operation block "satisfies the condition where the continual operation mainly as the fast forwarding and the continual operation mainly as the rewinding are alternately performed, and the oppositely directed continual operations of video are partially overlapped with each other with respect to time". If the condition is satisfied, the pattern A/B operation block is extended, and the process is repeatedly performed until the operation which satisfies the aforementioned condition is not detected to perform the forward setting of the pattern A/B interest video searching operation block. Meanwhile, the condition is not satisfied, the forward setting of the pattern A/B interest video searching operation block is performed without extending the pattern A/B operation block.

FIG. 24 shows the data structure of the preview log having the pattern A/B forward setting performed. In the embodiment, the pattern A/B operation block is extended by the operation numbers 1 to 4 to perform the forward setting of the pattern A/B interest video searching operation block.

After performing the A/B forward setting in step 2004, the pattern A/B backward setting is performed (step 2005) With the pattern A/B backward setting, the operation subsequent to the pattern A/B operation block is subjected to the determination based on the feature of the interest video searching operation block whether or not there is the continual operation where an interval from start to end of one continual operation contained in the obtained pattern A/B operation block includes an end time of the other continual operation subsequently performed subsequent to the pattern A/B operation block. Then the backward setting of the pattern A/B interest video searching operation block is performed. That is, it is determined whether or not the operation subsequent to the pattern A/B operation block satisfies "the condition where the continual operation mainly as the fast forwarding and the continual operation mainly as rewinding are operated alternately, and the oppositely directed continual operations of video are partially overlapped with each other with respect to time. When the condition is satisfied, the pattern A/B operation block is extended, and the process is repeatedly performed until the operation which satisfies the aforementioned condition is no longer detected. Then the backward setting of the pattern A/B interest video searching operation block is performed. Meanwhile, when the condition is not satisfied, the backward setting of the pattern A/B interest video searching operation block is performed without extending the pattern A/B operation block.

FIG. 25 shows the data structure of the preview log having the pattern A/B backward setting performed. In the embodiment, the backward setting of the pattern A/B interest video searching operation block is performed without extending the pattern A/B operation block. After performing the pattern A/B forward setting in step 2004 and the pattern A/B backward setting in step 2005, it is determined whether or not other pattern A/B operation block exists (step 2006). If it exists, the process returns to step 2004 to perform the same process as described above. If it does not exist, the process ends (END).

Figure 22:
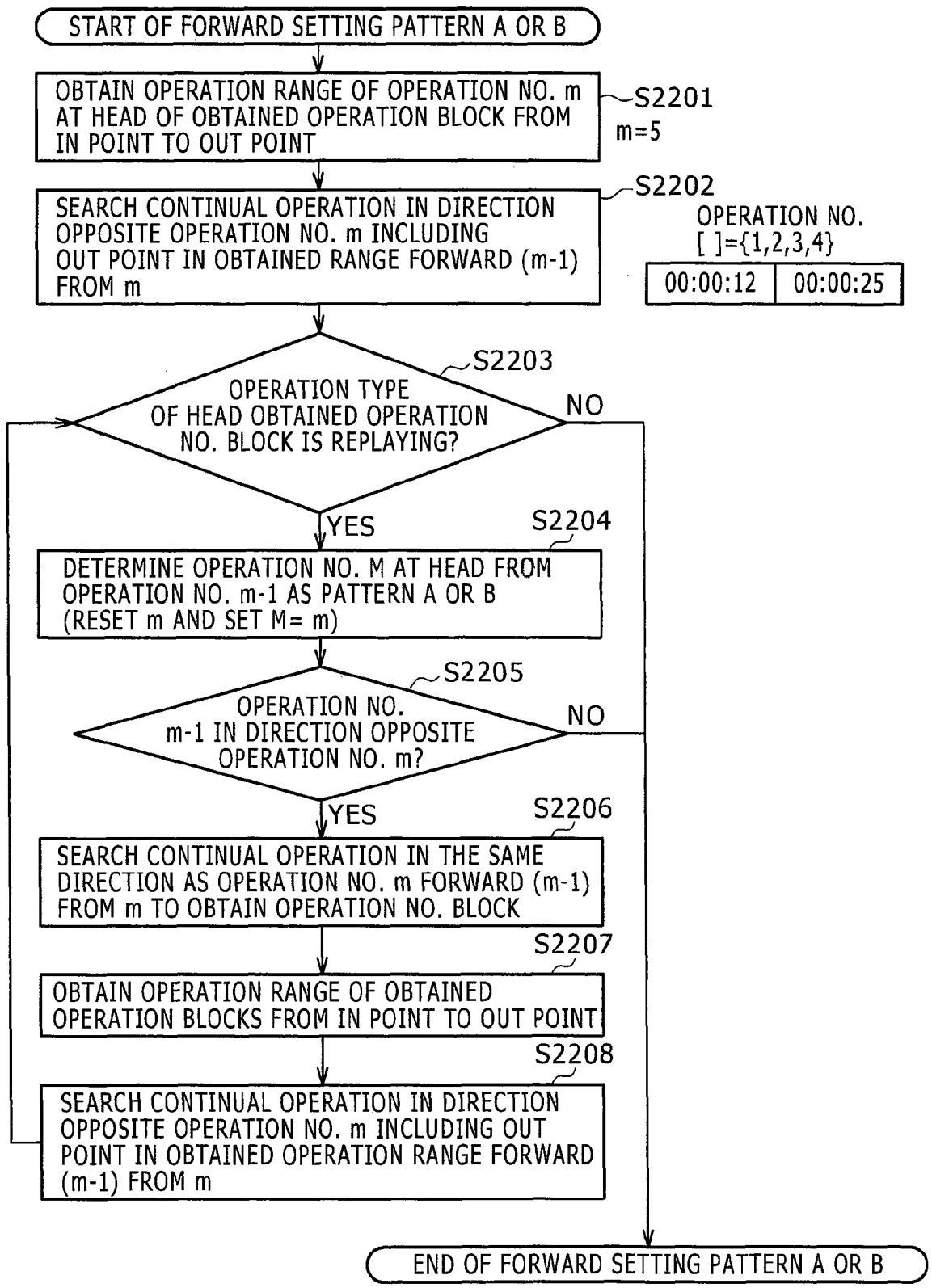
FIG. 22 is a flowchart of a pattern A/B forward setting process.

The pattern A/B forward setting process performed in step 2004 will be described referring to FIG. 22. When starting the pattern A/B forward setting (START), the operation range of the operation number m at the head of the obtained pattern A/B operation block is obtained from In and Out points (step 2201). In the embodiment, the operation number 5 is obtained, and In point of "00:00:35" and Out point of "00:00:12" thereof are obtained. The continual operation in the direction opposite the operation number m which contains Out point in the obtained operation range is searched forward (m−1 direction) from the operation number m (step 2202). It is determined whether or not the continual operation exists, and whether or not the operation type of the operation number at the head of the operation block is the replaying (step 2203). In the embodiment, it is determined that the continual operation including the operation numbers 1 to 4 exists, and the operation type of the operation number 1 is not the replaying (fast forwarding).

When the operation block exists and the operation type at the head is not the replaying, the last operation number M from the operation number m−1 to the head operation block is determined as the pattern A or B (step 2204). When the operation block does not exist, or the operation type at the head is the replaying, the process for the pattern A/B forward setting ends (END). In the embodiment, the operation numbers 1 to 4 are determined as the pattern A or B. After determining the last operation number M as the pattern A or B in step 2204, the previous operation number m is reset to be replaced by the operation number M.

After determining the operation number m as the pattern A or B in step 2204, it is determined whether or not the operation numbers m−1 and m are oppositely directed (step 2205). When the operation number m−1 exists and is oppositely directed, the continual operation in the same direction as the operation number m is searched forward (m−1) from the operation number m to obtain the operation block (step 2206). Then the operation range of the operation block from the In and Out points is obtained (step 2207). Meanwhile, when the operation number m−1 does not exist, or the operation number m−1 is not oppositely directed, the pattern A/B forward setting ends (END). In the embodiment, the operation number m−1 does not exist, and accordingly, the process ends.

The continual operation in the direction opposite the operation number m including the Out point in the obtained operation range is searched forward (m−1 direction) from the operation number m, and the operation block is obtained (step 2208). It is determined whether or not the operation block exists, and it is further determined whether or not it is the replaying (step 2203). Thereafter, the same process as described above will be performed. The pattern A/B forward setting is performed in the aforementioned steps.

Figure 23:
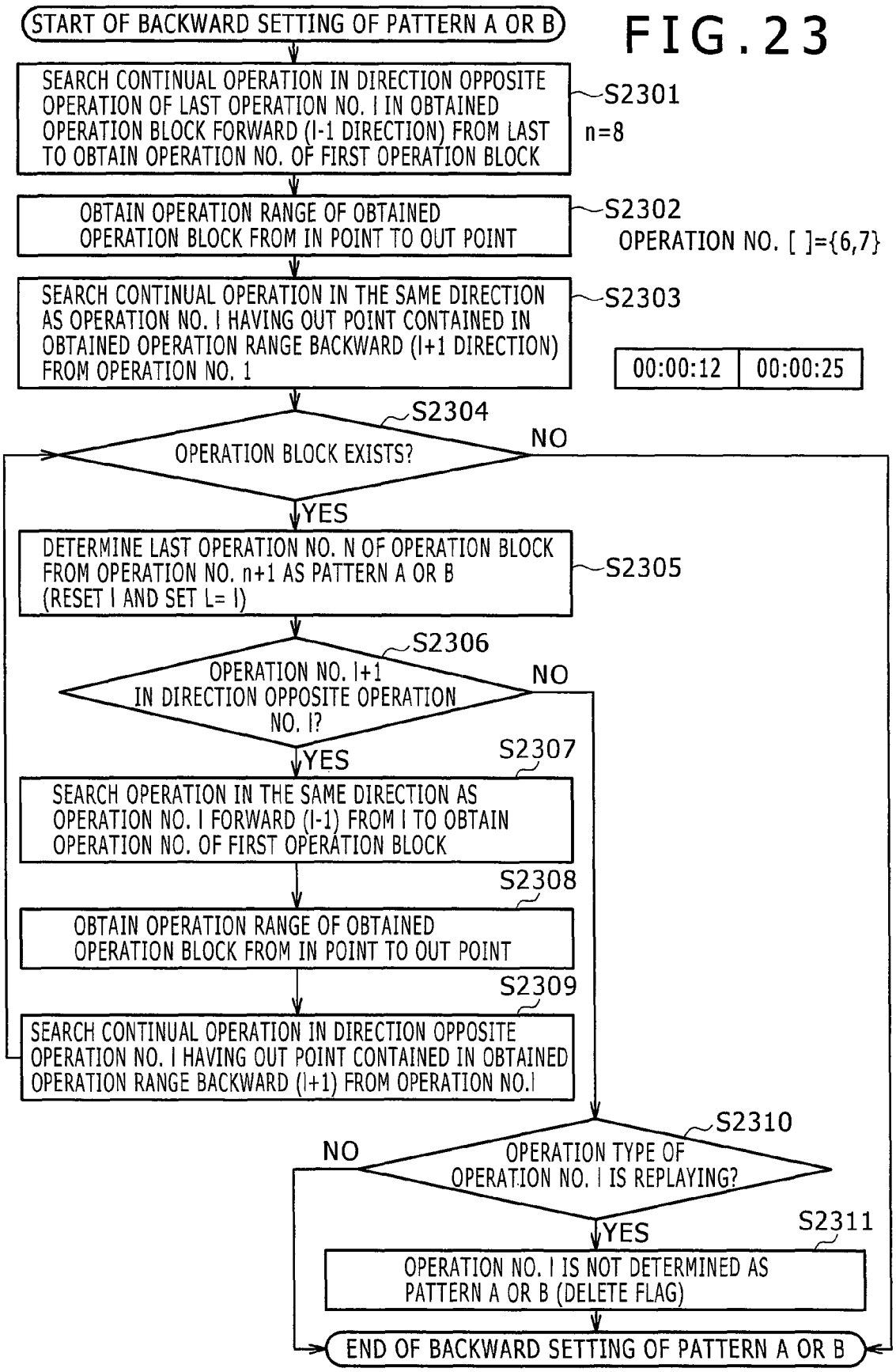
FIG. 23 is a flowchart of a pattern A/B backward setting process.

Then the pattern A/B backward setting in step 2005 will be described referring to FIG. 23. When starting the pattern A/B backward setting (START), the continual operation in the direction opposite the operation direction of the operation number n as the last of the operation block with the obtained pattern A/B is searched forward (l−1 direction) from the last. The operation number of the first operation block is obtained (step 2301), and the operation range of the operation block is obtained from the In and Out points (step 2302). In the embodiment, the operation numbers 6 and 7 are obtained, and the In point of "00:00:12" and the Out point of "00:00:25" are obtained. Then the continual operation in the same direction as the operation number 1 having the Out point existing in the obtained operation range is searched backward (l+1 direction) from the operation number 1 (step 2303). It is determined whether or not the operation block exists (step 2304). When the operation block exists, the last operation number L of the operation block from the operation number l+1 is determined as the pattern A or B (step 1605). When it does not exist, the pattern A/B backward setting ends (END). In the embodiment, it is determined that the operation block does not exist, and the process ends. After determining the last operation number L from the operation number l+1 as pattern A or B, the previous operation number l is reset to be replaced by the operation number L.

After the operation number n is determined as the pattern A or B in step 2305, it is determined whether or not the operation number 1 and the l+1 are oppositely directed (step 2306). If they are oppositely directed, the operation in the same direction as the operation number 1 is searched forward (l−1) from the operation number 1, and the operation number of the first operation block is obtained (step 2307). The operation range of the operation block is obtained from the In and Out points (step 2308). The continual operation in the direction opposite the operation number 1 having the Out point existing in the obtained operation range is searched backward (l+1 direction) from the operation number 1 (step 2309). Thereafter, the same process as described above is performed. Meanwhile, when the operation numbers l+1 and 1 are not oppositely directed, it is determined whether or not the operation type of the operation number 1 is the replaying (step 2310). When it is the replaying, determination is made that the operation number 1 determined as pattern A/B is no longer the pattern A/B, and accordingly, the flag is deleted (step 2311). The pattern A/B backward setting ends (END) Meanwhile, when it is not the replaying, the pattern A/B backward setting ends (END). The A/B backward setting is performed in the aforementioned steps.

The interest video searching operation detection unit 103 outputs the interest video searching operation block set through the determination based on the feature of the interest video searching operation block in an identifiable way. FIG. 26 shows the data structure output from the interest video searching operation block detection unit 103. Referring to FIG. 26, the "interest video searching operation block flag" corresponding to the detected interest video searching operation block is set to "1", and the flag corresponding to other operation number is set to "0". This makes it possible to identify the interest video searching operation block performed by the user until the interest video section is reached. In the embodiment, the operation type with the pattern C at the head is the replaying, and the operation after replaying the head is considered as the operation block for searching the replayed content. Then the flag corresponding to the head of the pattern C is set to "0" rather than "1". The preview log is input to the user interest section detection unit 104 for detecting the user interest section determined as the "replaying for thoroughly viewing the searched video section" obtained by eliminating the replay section contained in the interest video searching operation block from all the replay sections of the input preview log. FIG. 27 shows a structure of data output from the user interest section detection unit 104. The user interest section detection unit 104 detects the operation number having the interest video searching operation block flag set to "0" and the operation type determined as the replaying, and further determines whether or not the replaying is performed immediately after searching the interest image searching operation block. When the operation number is determined as having been replayed immediately after searching the interest video searching operation block, the corresponding "flag immediately after searching" is set to "1", and the flag corresponding to the other operation number is set to "0". When the searching operation flag of the previous operation number as the replaying is set to "1", it is determined as the replaying performed immediately after searching the interest video searching operation block. Then the flag immediately after searching the operation number is set to "1". The user interest section detection unit 104 outputs the preview log (see FIG. 27) showing the user interest section to the importance information giving unit 105.

The importance information giving unit 105 gives the importance information to each of the operation numbers according to the "flag immediately after searching" in the preview log indicating the user interest section input from the user input section detection unit 104 using an importance information table (see FIG. 28B) for managing by correlating the "flag immediately after searching" with "importance information" so as to be output in the identifiable way. FIG. 28A shows the data structure output from the importance information giving unit 105. Referring to FIG. 28A, when the operation number having the "flag immediately after searching" set to "1" exists in the preview log (see FIG. 27) output from the interest section determination unit 104, the importance information "10" shown in the importance information table (see FIG. 28B) is given to the corresponding operation number. When the operation number corresponding to the "flag immediately after searching" set to "0" exists in the preview log, the importance information "5" shown in the importance information table is given to the corresponding operation number. This makes it possible to give the predetermined importance information only to the important section in accordance with the "flag immediately after searching". The importance information giving unit 105 outputs the preview log (see FIG. 28A) indicating the importance information to the video/importance information storage unit 106.

The video/importance information storage unit 106 obtains the preview log (see FIG. 28A) indicating the importance information input from the importance information giving unit 105 so as to be stored together with the video. The user is allowed to retrieve only the desired video section in response to the video retrieval request using the importance information from the video stored in the video/importance information storage unit 106 via the video retrieval unit (GUI) 107.

The device and method for giving importance information allow the user to detect the operation block for "searching the desired video section" that is, the video operation block (interest video retrieval operation block) performed by the user until the interest video section is reached from the preview log as the user's video operation history. Then the "replaying for confirming the location of the image while searching the desired video section" is eliminated from the detected operation block. The importance information is given to the detected replaying section (user interest section) determined as the video section used for editing the program, that is, "the searched video section to be replayed for viewing thoroughly". The user is capable of retrieving only the desired video section, thus improving the retrieval and editing efficiency.

The device and method of the present invention for giving the importance information according to the video operation history is applicable not only to production of the program, but also automatic edit function of the HDD recorder for household use and automatic DVD production function. The interest video searching operation block of the video images picked up by the user may be detected from the preview log as the video operation history to give the importance information to the user interest section such that the video section desired by the user is only stored in the HDD recorder or the DVD. The present invention may be applied to the automatic CM cut function of the HDD recorder for household use. The interest video searching operation block is detected from the preview log as the user's video operation history using the recorded program, and the CM cut section is eliminated. Then the importance information is given to the program section as the user interest section such that the program section desired by the user may only be stored. The present invention is applicable not only to the production of the program but also to the personal use.

The device for giving importance information may be of separate type rather than an integrated type which has been described in the embodiment of the present invention. In the embodiment of the present invention, the structure for detecting the interest video searching operation block from the preview log, and the structure for giving the importance information to the detected interest video searching operation block may be separately provided. The structure with separate importance information giving device may be used for producing the program by both sides for performing the rough editing and the main editing. It may also be used for household use, for example, for both transmission station and the receiver station.

The importance information giving device according to the present invention may be structured to employ segment meta data together with the preview log for correcting the starting point and end point of the detected user interest section so as to completely accord those of the video section desired by the user.

Having described the present invention as the preferred embodiment, it is to be understood by those skilled in the art that various changes and modifications may be made in the present invention without departing from the scope thereof.

What is claimed is:

1. A device for giving importance information according to a video operation history comprising an interest video searching operation block detector which includes:
    a video operator for performing a video operation in response to a video operation request which includes fast forwarding, rewinding, and replaying performed by a user;
    a preview log generator coupled to the video operator and generating a video operation history according to the video operation performed by the video operator;
    an interest video searching operation block detector coupled to the preview log generator and detecting the video searching operation block performed by the user from the preview log generated by the preview log generator until the interest video section is reached;
    a user interest section detector coupled to the interest video searching operation block detector and detecting a user interest section by eliminating a replay section contained in the interest video searching operation block detected by the interest video searching operation block detector from a plurality of replay sections contained in the preview log; and
    an important information giver coupled to the interest section detector and giving importance information to the user interest section detected by the user interest section detector; wherein the interest video searching operation block detector further includes:
   a minimum searching operation block detector for determining the operations having oppositely directed video operations overlapped with each other with respect to time among said fast forwarding, rewinding and replaying as the interest video searching operation block from a preview log as a video operation history of a user, and further detecting a minimum searching operation block of a minimum unit which exists in an interest video searching operation block; and
   a searching operation block setter coupled to the minimum searching operation block detection unit and having pattern setting unit for setting the interest video searching operation block through determination with respect to an operation previous and subsequent to the detected minimum searching operation block as a base point based on a feature of the interest video searching operation block.

2. The device for giving importance information according to a video operation history according to claim 1,
   wherein the minimum searching operation block is detected by the minimum searching operation block detector based on patterns each having a predetermined operation feature; and
   in one of the patterns having the predetermined operation features, rewinding is performed immediately after fast forwarding or a combination of the fast forwarding and replaying, and an end point of the rewinding exists in an interval from start to stop of the fast forwarding or the combination of the fast forwarding and the replaying.

3. The device for giving importance information according to a video operation history according to claim 1, wherein the minimum searching operation block is detected by the minimum searching operation block detector based on patterns each having the predetermined operation feature; and
   in one of the patterns having the predetermined operation features, fast forwarding or a combination of the fast forwarding and replaying is performed immediately after rewinding, and an end point of the fast forwarding or the combination of the fast forwarding and the replaying exists in an interval from start to end of the rewinding.

4. The device for giving importance information according to a video operation history according to claim 1, wherein the minimum searching operation block is detected by the minimum searching operation block detector based on patterns each having the predetermined operation feature; and
   in one of the patterns having the predetermined operation features, rewinding is performed immediately after replaying, and an end point of the rewinding exists in an interval from start to end of the replaying.

5. The device for giving importance information according to a video operation history according to claim 1, wherein the minimum searching operation blocks detected based on the patterns to have common operations are combined into a new minimum searching operation block by the searching operation block setting unit.

6. The device for giving importance information according to a video operation history according to claim 1,
   wherein the searching operation block setter performs a continual operation mainly as fast forwarding and a continual operation mainly as rewinding alternately and determines whether or not the oppositely directed continual operations of video are partially overlapped with each other with respect to time using an operation type, and a starting time and an end time of the operation shown in the preview log with respect to operations previous and subsequent to the minimum searching operation block to set an interest video searching operation block in accordance with a result of the determination.

7. The device for giving importance information according to a video operation history according to claim 1, wherein the searching operation block setter subjects an operation previous to an operation block obtained according to the minimum searching operation block to determination whether or not a continual operation where a starting time of a continual operation contained in the operation block exists in an interval from start to end of another continual operation previously performed exists to perform forward setting of an interest video searching operation block.

8. The device for giving importance information according to a video operation history according to claim 1, wherein the searching operation block setter subjects an operation subsequent to an operation block obtained according to the minimum searching operation block to determination whether or not a continual operation where an interval from start to end of a continual operation contained in the operation block includes an end time of another continual operation subsequently performed exists after the operation block to perform backward setting of an interest video searching operation block.

9. The device for giving importance information according to a video operation history according to claim 1, wherein:
   the user interest section detector detects user interest section by eliminating a replay section contained in the interest video searching operation block detected by the interest video searching operation block detector from all the replay sections contained in the preview log; and
   the importance information giving unit gives, based on the detection result obtained by the importance information giver, for giving importance information to the detected user interest section.

10. A method for giving importance information according to a video operation history, comprising the steps of:
   determining the operations having oppositely directed video operations overlapped with each other with respect to time which includes fast forwarding, rewinding, and replaying as the interest video searching operation block from a preview log which corresponds to a video operation history of user's input of said fast forwarding, rewinding, and replaying and further detecting a minimum searching operation block as a minimum unit which exists in an interest video searching operation block based on patterns each having a predetermined operation feature;
   setting an interest video searching operation block through determination with respect to an operation previous and subsequent to the detected minimum searching operation block as a base point based on a feature of the interest video searching operation block;
   detecting a user interest section by eliminating a replay section contained in the interest video searching operation block from all the replay sections contained in the preview log; and
   giving the importance information to the detected user interest section.

* * * * *